United States Patent [19]
Sauder et al.

[11] 3,928,097
[45] Dec. 23, 1975

[54] PROCESS AND MACHINE FOR MANUFACTURING INSULATION MODULES

[75] Inventors: Robert A. Sauder; Gary R. Kendrick, both of Emporia, Kans.

[73] Assignee: Sauder Industries, Inc., Emporia, Kans.

[22] Filed: Mar. 1, 1974

[21] Appl. No.: 447,359

[52] U.S. Cl. ............... 156/213; 156/250; 156/299; 156/443; 156/560
[51] Int. Cl.² ...................................... B29C 17/04
[58] Field of Search ........... 156/213, 214, 250, 256, 156/259, 443, 297–300, 516, 517, 556–563, 264, 265, 62.6, 578; 161/39, 40, 43–44; 219/99

[56] References Cited
UNITED STATES PATENTS

| | | | |
|---|---|---|---|
| 2,050,247 | 8/1936 | Cover | 156/297 X |
| 2,194,301 | 3/1940 | Fourness et al. | 161/43 X |
| 2,546,230 | 3/1951 | Modigliani | 156/264 X |
| 2,949,953 | 8/1960 | DiMaio et al. | 156/297 X |
| 3,011,932 | 12/1961 | Downing | 156/297 X |
| 3,012,923 | 12/1961 | Slatter | 156/62.2 |
| 3,139,369 | 6/1964 | Sullivan et al. | 156/563 |
| 3,325,324 | 6/1967 | Schmidt et al. | 156/264 X |
| 3,706,870 | 12/1972 | Sauder | 219/99 X |
| 3,736,215 | 5/1973 | Felder et al. | 156/271 X |
| 3,819,468 | 6/1974 | Sauder et al. | 156/71 X |

*Primary Examiner*—Douglas J. Drummond
*Assistant Examiner*—David A. Simmons
*Attorney, Agent, or Firm*—Arnold, White & Durkee

[57] ABSTRACT

Insulated modules for use as furnace liners or the like may be manufactured by accumulating a plurality of generally rectangular battens of similar size and, after arranging them edgewise in side-by-side relationship to define a generally rectangular pad of insulation material, bringing the rectangular pad of insulation material and a rigid or flexible substrate into assembly in the presence of an adhesive material such as an air dryed grout and allowing the grout to cure. Edge battens of fibrous insulation material may also be secured by adhesive to the exposed edges of the pad/block substrate assembly and may cooperate therewith to define the insulation module. A wrapper of protective material may be disposed at least partially about the insulation module. A machine for manufacturing the insulation modules may provide for an accumulation of stacked elongated layers of insulation material that may be transported linearly to severing apparatus that severs the stacked layers of insulation material longitudinally and also sever the stacked layers transversely at equal increments, thereby defining a plurality of insulation pads composed of arranged battens of insulation material, which pads are transported to a module assembly station subsequent to the severing operation.

44 Claims, 23 Drawing Figures

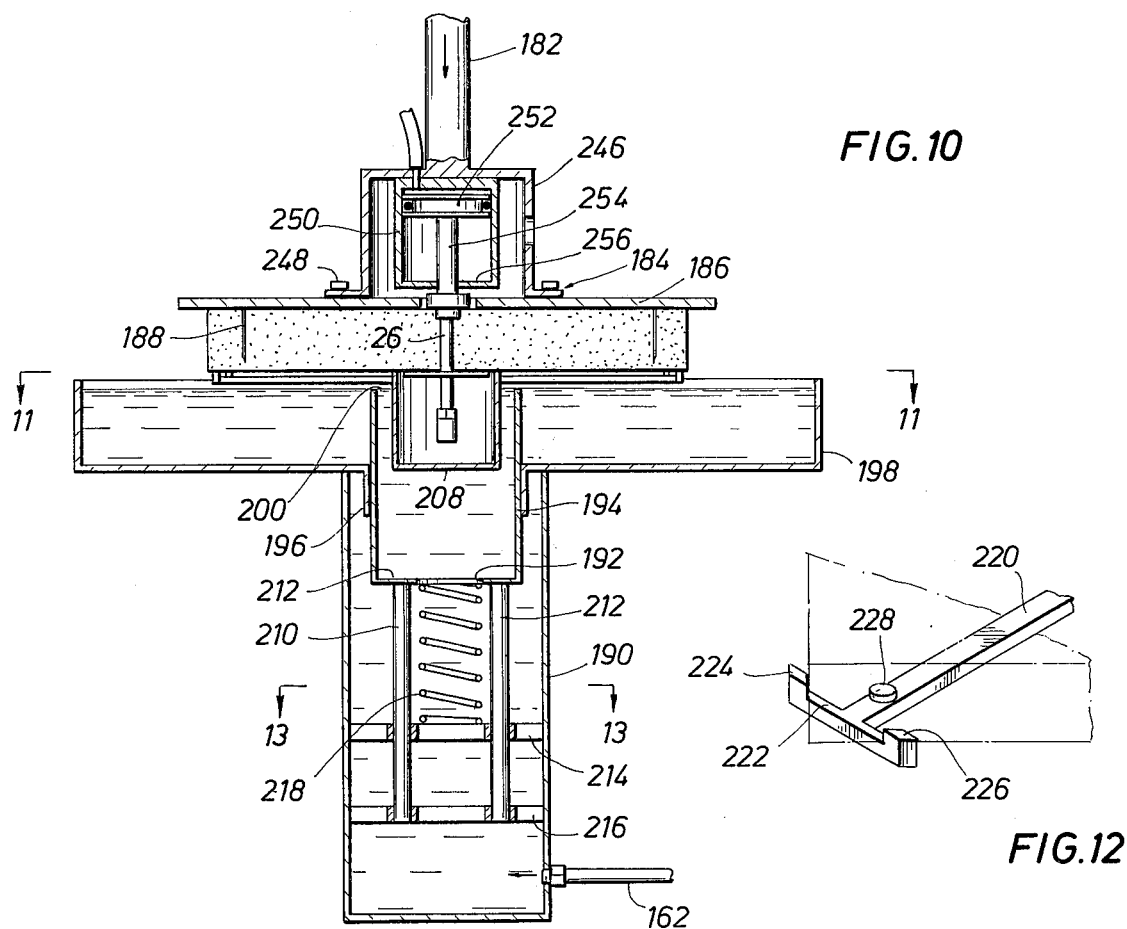
FIG. 10
FIG. 12
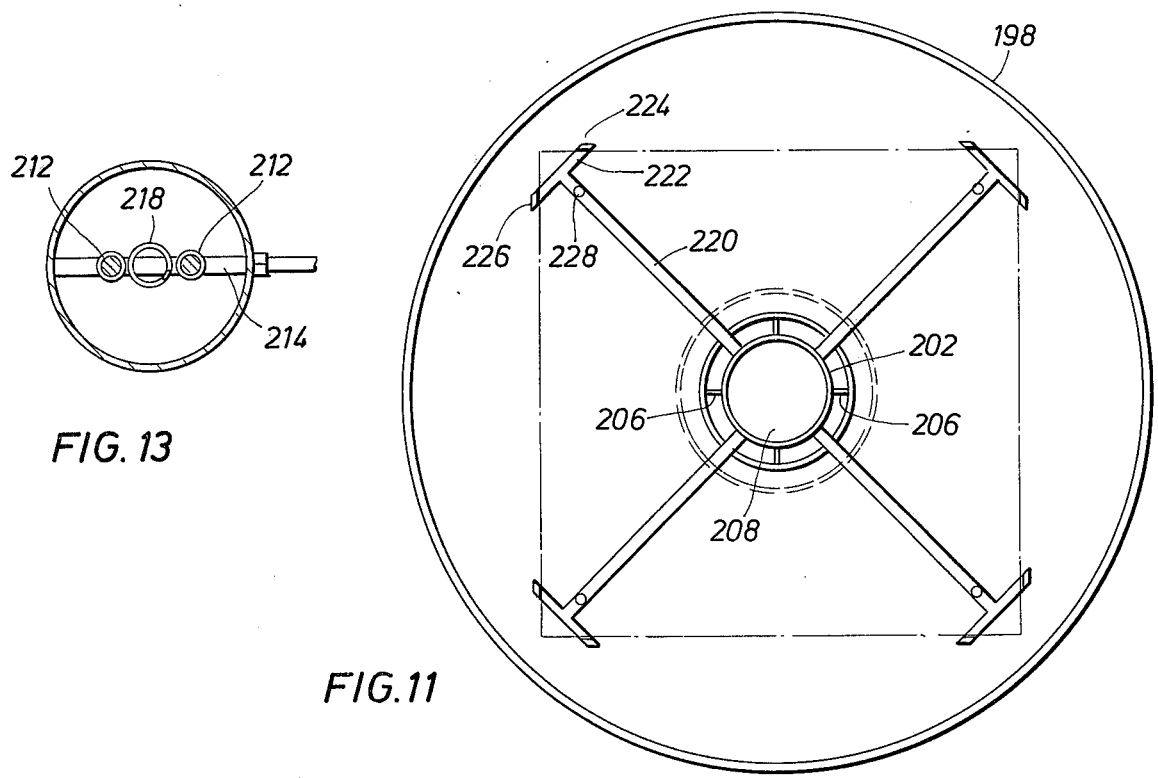
FIG. 13
FIG. 11

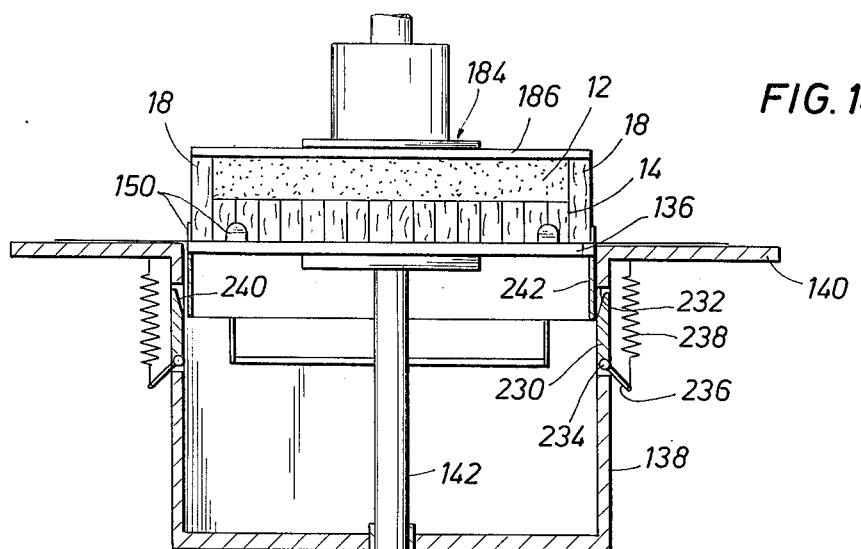
FIG. 14
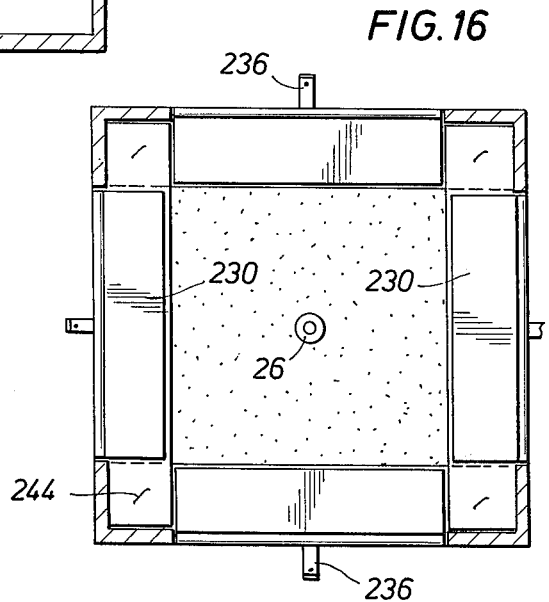
FIG. 16
FIG. 15
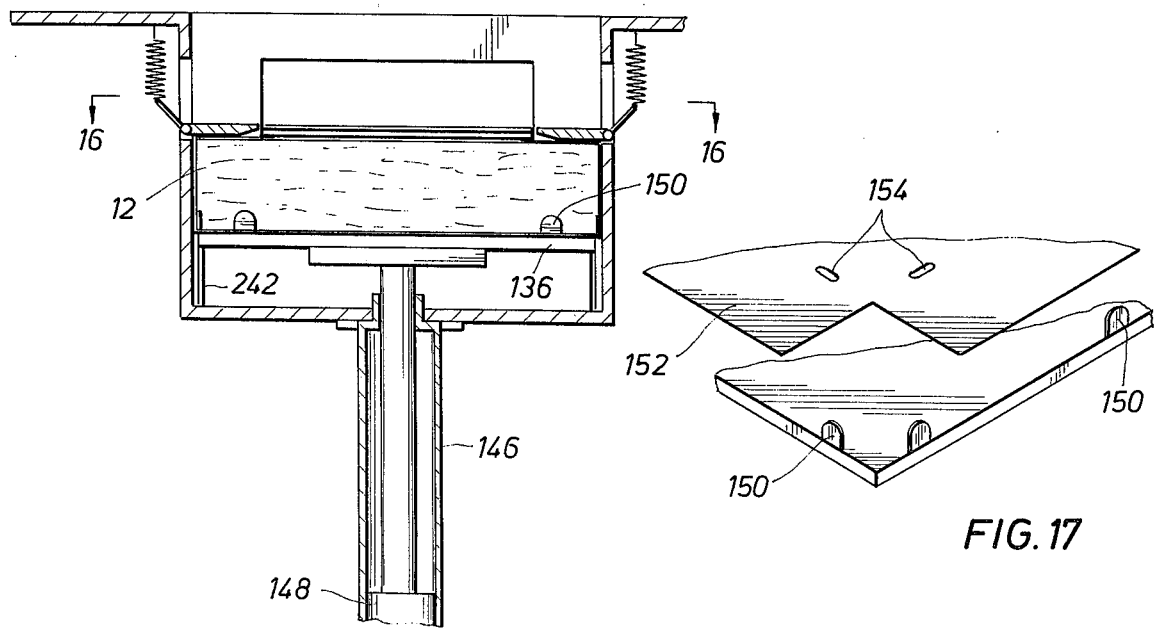
FIG. 17

FIG. 19
| | POWER ON | PUSH-RUN ADVANCE CONVEYOR | CONVEYOR STOPS SAW LOWERS | CUT OFF SAW HITS BOTTOM | END OF CYCLE |
|---|---|---|---|---|---|
| a | 0 | 0 | 1 | 1 | 1 |
| b | 1 | MOMENTARY | 1 | 1 | 1 |
| c | 0 | 0 | 1 | 1 | 1 |
| d | 0 | 1 | 1 | 0 | 0 |
| e | 0 | 1 | 1 | 0 | 0 |
| f | 1 | 1 | 1 | 0 | 1 |
| g | 1 | 1 | 1 | 1 | 1 |
| h | 0 | 0 | 1 | 0 | 0 |
| i | 0 | 0 | 1 | 0 | 0 |
| j | 0 | PULSE 1 | 0 | 0 | 0 |
| k | 1 | 1 | 1 | 1 | 1 |
| l | 0 | 1 | 1 | 1 | 1 |
| m | 1 | 1 | 1 | 1 | 1 |
| n | 1 | 1 | 0 | 0 | 0 |
| p | 0 | 1 | 0 | 0 | 0 |
| q | 1 | 1 | 1 | 1 | 1 |
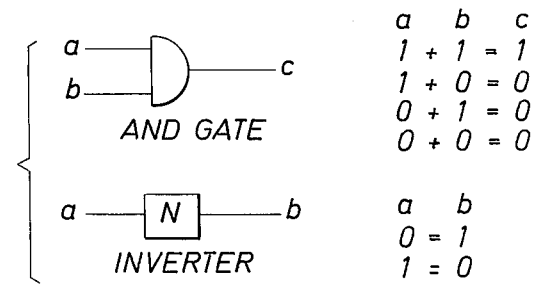
FIG. 20
AND GATE
```
a  b  c
1 + 1 = 1
1 + 0 = 0
0 + 1 = 0
0 + 0 = 0
```
INVERTER
```
a  b
0 = 1
1 = 0
```
FIG. 22
| | POWER ON | PUSH-RUN ADVANCE CONVEYOR | CONVEYOR STOPS SAW LOWERS | CUT OFF SAW HITS BOTTOM | END OF CYCLE |
|---|---|---|---|---|---|
| a | 1 | 1 | 1 | 1 | 1 |
| b | 0 | 0 | 1 | 1 | 1 |
| c | 0 | 0 | 1 | 1 | 1 |
| d | 0 | 1 | 1 | 0 | 0 |
| e | 0 | 1 | 1 | 0 | 0 |
| f | 1 | 1 | 1 | 0 | 1 |
| g | 1 | 1 | 1 | 1 | 1 |
| h | 0 | 0 | 1 | 0 | 0 |
| i | 0 | 0 | 1 | 0 | 0 |
| j | 0 | PULSE 1 | 0 | 0 | 0 |
| k | 1 | 1 | 1 | 1 | 1 |
| l | 0 | 1 | 1 | 1 | 1 |
| m | 1 | 1 | 1 | 1 | 1 |
| n | 1 | 1 | 0 | 0 | 0 |
| p | 0 | 1 | 0 | 0 | 0 |
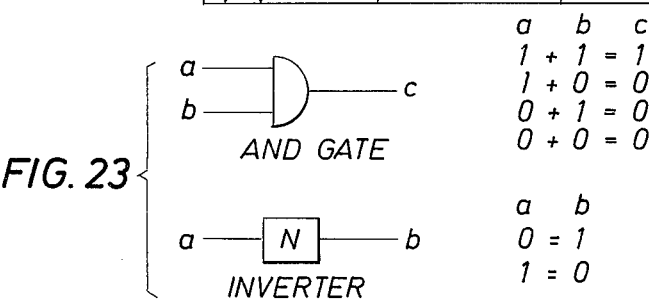
FIG. 23
AND GATE
```
a  b  c
1 + 1 = 1
1 + 0 = 0
0 + 1 = 0
0 + 0 = 0
```
INVERTER
```
a  b
0 = 1
1 = 0
```

PROCESS AND MACHINE FOR MANUFACTURING INSULATION MODULES

FIELD OF THE INVENTION

This invention relates generally to insulated linings for wall structures, such as linings for furnaces and the like and more particularly is directed to an insulated wall lining module, a plurality of which may be simply and readily adhered to the wall structure of a furnace or the like in such manner as to expose a fibrous insulating surface that is exposed directly to the heat from which insulation is desired. Even more specifically, the invention is directed to the provision of a machine and a method for manufacturing insulation modules for lining the wall structures of enclosures such as furnaces and the like.

BACKGROUND OF THE INVENTION

Enclosures such as furnaces and the like that are subjected to a high degree of heat, for example 1500°F to 2500°F and above have for the most part masonry the past been composed of a special heat resistant masosnry material. The masonry material, typically referred to as fire brick or castable heat resistant masonry material, is time consuming and expensive to install, thereby requiring extensive furnace down time for installation or repair of furnace linings and in addition, is quite expensive both in cost and installation. A fire brick type of furnace lining is composed of special fire bricks that are assembled in the furnace brick by brick by highly skilled masons or bricklayers utilizing a special heat resistant mortar. The materials and labor for lining a furnace or other such enclosure with fire brick are quite expensive, therby rendering such type of insulation undesirable for at least certain kinds of furnaces. Castable furnace lining material is also expensive and must be applied by specially trained personnel, thereby increasing the cost of a typical furnace lining to the point that castable linings for at least some types of furnaces are expensive to the point of undesirability.

Most masonry, including fire brick or castable heat resistant masonry requires a substantial time for installation and the down time of a production furnace, such as a metal heat treating furnace for example, adds a commercial disadvantage that also renders masonry furnace linings undesirable.

It is also desirable at times to repair small segments of a furnace lining and, where castable or fire brick linings are employed, the furnace down time required for such furnace repairs also renders these types of linings generally undesirable. Moreover, the commercial advantages of fire brick or castable type masonry furnace linings are also adversely affected by the high labor costs that are required in all types of masonry furnace repairs because of the high degree of skill required for workmen accomplishing furnace repair operations.

Accordingly, it is a primary object of the present invention to provide a novel process for assembling insulation modules wherein each of the modules is composed of a plurality of battens of fibrous insulation material that are disposed in side-by-side relationship with a module surface being exposed to the heat of the enclosure, which module surface is defined by exposed edge surfaces of the various battens of insulation material.

It is also an object of the present invention to provide a novel process for assembling an insulation module incorporating novel means for providing an assembled arranged collection of properly related battens of fibrous insultion material.

It is an even further object of the present invention to provide a novel process for assembling an insulation module for enclosures such as furnaces or the like, wherein the various parts of the module are assembled by means of an adhesive material having a predetermined curing period and wherein the assembled module is maintained under mechanical compression during at least a portion of the curing period of the adhesive material to insure permanent physical assembly of the various components of each of the modules.

Among the several objects of the present invention is contemplated the provision of a novel process for assembling a module of insulation material, wherein a wrapping of protective material may be aplied above a module during assembly thereof, which protective wrapping may retain the assembled module under a degree of mechanical compression during the remaining curing period of the adhesive material to insure permanent assembly of all of the components of the module.

It is also an important object of the present invention to provide a novel machine for manufacturing insulation modules for the wall structures of enclosures such as furnaces or the like that provide a supply of fibrous insulation material in the form of an elongated multilayer stack that is fed incrementally to a supply and severing station of the machine.

It is also an object of the present invention to provide a novel machine for manufacturing insulation modules including fibrous battens of insulation material wherein a multi-layer stack of insulation material is arranged in such manner that a subsequent stack of insulation may be assembled thereto in such manner that a vertical jont is not established by assembly of the stack and incrementally severed pads of insulation material may be formed without any waste or disorganization of the layers of insulation material at at the joint between the multi-layer supply stacks.

It is an even further object of the present invention to provide a novel machine for manufacturing insulation modules wherein the machine incorporates an adhesive application station where adhesive material such as grout is applied to a generally rigid block of insulation material that forms the core of the insulation modules assembled by the machine.

It is also an object of the present invention to provide a novel machine for manufacturing insulation modules wherein the mechanism of the machine incorporates a movable fixture to which the block may be adhered or retained and which fixture transports the block of material to the adhesive application station and, after adhesive material is applied, transports the adhesive coated block of insulation material to an assembly station for assembly with a pad of fibrous insulation material.

Among the several objects of the present invention is noted the contemplation of a novel machine for manufacturing insulation blocks, which machine may incorporate a module assembly and wrapping station that receives a pad of insulation material composed of a plurality of edge arranged battens and also receives an adhesive coated block of insulation material in such manner that the block and the pad are assembled under mechanical pressure that is applied at least during a portion of the curing time of the adhesive material.

It is an even further object of the present invention to provide a novel machine for manufacturing insulation modules wherein the mechanism of the machine incorporates means for wrapping the module during assembly thereof with a protective wrapping, which wrapping is applied in such manner as to maintain the insulation module under mechanical compression at least until the adhesive material has cured.

It is another important object of the present invention to provide a novel machine for manufacturing insulation modules wherein the machine may be operated by a limited number of employees, thereby maintaining labor for manufacture of the insulation modules at a minimum.

Another feature of the present invention contemplates the provision of a novel machine for manufacturing insulation modules which machine incorporates an insulation pad transporting fixture that receives a pad of insulation material composed of a plurality of edge arranged battens at each incremental severing step and retains the pad in properly assembled position during transporting of the pad to the module assembly station of the machine.

It is an even further object of the present invention to provide a novel fixture for an insulation module manufacturing machine, which fixture may incorporate means for properly positioning the pad of insulation material at a module assembly station of the machine.

It is among the several objects of the present invention to provide a novel fixture for an insulation module manufacturing machine, wherein the fixture incorporates means for ejecting an assembled pad of insulation material as a unit after positioning of the pad at the assembly station of the machine.

It is also an object of the present invention to provide a novel machine for manufacturing insulation modules for subsequent assembly as the insulating lining of furnaces or other like enclosures wherein the machine, the components of the machine and the process of manufacture employed by the machine is of simple nature, is reliable in use and low in cost.

Other and further objects, avantages and features of the present invention will become apparent, to one skilled in the art, upon consideration of this entire disclosure, including the specification and the annexed drawings hereof. The form of the invention, which will now be described in detail, illustrates the general principles of the invention, but it is to be understood that this detailed description is not to be taken as limiting the scope of the present invention.

SUMMARY OF THE INVENTION

The machine and process for the manufacture of insulation modules composed of a combination of a substrate and a pad of fibrous insulation material may take the following briefly described form, together with any other form that may be within the spirit and scope of the present invention.

A suitable process for manufacturing insulated enclosure liner modules may include accumulation of a number of battens of insulation material, arranged in side-by-side relation with edge surfaces therof exposed and forming the side surfaces of a pad of insulation material. The pad may be transported from the site where the pad is formed to an assembly station for assembly of the pad with a substrate that may take the form of a generally rigid block of insulation material which forms the core of an insulation module. The pad of insulation material may be positioned at the assembly station in relation to a quantity of wrapping material that may be subsequently positioned about the insulation module. A block of insulation material may be retained by a fixture and may be transported to a contained volume of adhesive material and may be inserted into the adhesive material to such extent that one side surface and substantially all of the edge surfaces of the block may be coated with the adhesive material. The adhesive coated block may then be transported by the fixture to the assembly station and may be brought into proper assembly with the pad of insulation material that is retained in proper position at the assesmbly station. Edge battens of insulation material that are of sufficient width to cover the combined thickness of the pad/block assembly may be brought into assembly with the edge portions of the pad/block assembly and may be adhered thereto by the adhesive material disposed on the edge surfaces of the core block of insulation material.

Mechanical pressure may be brought to bear upon the uncured module assembly by upper and lower hydraulic cylinders carrying module engagement and support plates, respectively. The upper and lower hydraulic cylinders are correlated in such a manner that the upper cylinder after reaching application of a predetermined degree of mechanical pressure, will overpower the lower hydraulic cylinder and force the module assembly downwardly into a module containing a wrapping receptacle. Wrapping material may be forced into the receptacle along with the module and mechanical wrapping material folding apparatus within the receptacle will cause the wrapping material to be folded about the module in such a manner that portions of the wrapping material are lapped into engagement with the rigid block or core of the modules. Stapling apparatus may then be employed to secure the folded edges of the wrapping material by insertion of the staples through the wrapping material and into the rigid insulation block.

The machine for assembling insulation modules may incorporate an elongated conveyor mechanism upon which may be stacked a plurality of layers of insulation material, the layers incorporating fibers that are arranged in planar orientation. The conveyor mechanism is operative to impart linear movement to the stack of layers of fibrous material disposed thereon, such movement being in equal increments, such increments defining the width of the battens that are employed in assembly of the pads of insulation material.

The trailing edges of the various layers of insulation material may be offset one relative to the other by a distance equaling the width of the battens of insulation material, thereby allowing a subsequent stack of insulation material to be formed tht does not have a vertically jointed relationship with the preceding stack. As the stairstepped joint is advanced incrementally through the batten forming severing station, the joint will not interfere in any manner whatever with the stack of insulation material. The insulation material thus may be fed in generally continuous manner by the conveyor mechanism without any waste of material whatever.

The insulation module machine may incorporate at least one and preferably a pair of severing devices capable of severing the stacked layers of insulation material into accumulated groups of battens that define the pads of insulation material. One of the severing devices may conveniently take the form of a transversely disposed saw, such as a band saw that makes a cross cut through the stack of insulation layers following each incremental movement of the conveyor, the extremities of each of the layers of insulation cut away by the transverse severing operation define an insulation pad that is of proper size and accumulation for placement at an assembly station of the machine having a plurality of pad orienting fingers that maintain the pad in proper position until a module assembly operation is subsequently accomplished.

A second severing device may conveniently take the form of a vertically oriented band saw that severs the stack of insulation layers longitudinally as the stack is moved linearly, thereby in effect, defining two longitudinal stacks of insulation layers that may be severed by the transverse severing operation into a pair of accumulated pads of insulation material.

The pads of insulation material severed from the stack may be transported to and properly positioned at the assembly station by a pad retaining and transporting fixture that may be disposed adjacent the leading extremety of the stacks of layers and may incorporate a plurality of impaling needles that are inserted into the soft insulation material as the stacks of insulation material are moved linearly and incrementally by the conveyor mechanism of the machine. After the pads of insulation material have been severed from the stacks of layers, the pads will be retained by the impaling pins in assembly with the fixture and the fixture, with the pads attached, may be transported manually or mechanically to the assembly station where the pads may be inserted into proper receiving relationship with the plurality of pad alignment fingers at the assembly station. The fixture may incorporate a locking mechanism to insure retention of the pad in assembly with the fixture during transportation and may also incorporate an ejection mechanism that enables the fixture to be separated from the pad after the pad has been positioned in receiving relationship at the assembly station.

The machine may also incorporate at least one adhesive application station wherein a quantity of adhesive material such as grout may be contained in such manner that a block of rigid insulation material may be lowered into the contained grout in such manner as to coat at least one side surface and substantially all of the edge surfaces of the block with a coating of adhesive grout. A block transporting fixture may also be provided in the various structural components of the machine, which fixture may incorporate means for retention and transporting of a block of insulation material. A fixture may be related to this machine structure in such manner that the block, after being properly coated, may be transported by the fixture to proper oriented relationship with a pad of insulation material being retained at the assembly station and the block may be lowered by the fixture into assembly with the pad causing the adhesive to secure the block to the pad.

At the assembly station may be provided a receptacle of essentially the same external configuration as the external configuration of the module being formed and after assembly of edge battens of insulation material about the edges of the block and pad, the module may be forced into the receptacle thereby causing the module to be properly contained under compression at least during initial curing of the adhesive material. Locator devices may also be provided at the assembly station, allowing a sheet of wrapping material to be properly located relative to the module to be formed. As the module is forced into the receptacle, portions of the wrapping material become folded about the side portions of the module and after full insertion of the module into the receptacle, a plurality of folding devices cause portions of the wrapping material to be folded about at least a portion of the top surface of the momdule where the wrapping material may be brought into juxtaposition with the top surface of the rigid block of insulation material. The wrapping material may be stapled into place by inserting staples through the wrapping material into the rigid insulation block.

BRIEF DESCRIPTION OF THE DRAWINGS

So that the manner in which the above recited features, advantages and objects of the present invention, as well as others, which will become more apparent, are attained and can be understood in detail, more particular description of the invention, briefly summarized above, may be had by reference to the embodiment thereof which is illustrated in the appended drawings, which drawings form a part of this specification.

It is to be noted however that the appended drawings illustrate only a typical embodiment of the invention and are therefore not to be considered limiting of its scope, for the invention may admit to other equally effective embodiments.

In the Drawings:

FIG. 1 is an exploded isometric view of an insulation module constructed in accordance with the present invention and depicting in detail the various parts of the module structure.

FIG. 2 is an isometric view having a part thereof broken away depicting the relationship of the insulation module and the various parts thereof and showing the relationship of the wrapping material and the insulation module prior to folding of the wrapping material about the insulation module.

FIG. 3 is an isometric view of a finished insulation module constructed in accordance with this invention and showing the relationship of the wrapping material to the upper surface of the module structure.

FIG. 4 is a sectional view taken along line 4—4 in FIG. 3, depicting the module structure in section and showing the relationship of the module welding stub to the module structure.

FIG. 5 is a partial side elevational view of a machine constructed in accordance with the present invention for the manufacture of the insulation modules of FIGS. 1–4.

FIG. 6 is a plan view of the machine depicted in FIG. 5, the plan view being taken along line 6—6 in FIG. 5.

FIG. 7 is a fragmentary isometric view of a portion of the machine structure set forth in FIG. 5 and depicting movement of a pair of completed pads of insulation material away from the stacks of insulation material from which the pads are severed during the transverse severing operation.

FIG. 8 is a sectional view illustrating the pad retaining fixture structure of the machine set forth in FIGS. 5–7 and showing a pad of insulation material being retained by the impaling pins of the fixture.

FIG. 9 is a transverse sectional view taken along line 9—9 of FIG. 8 and depicting the locking mechanism of the fixture structure in detail.

FIG. 10 is a sectional view taken along line 10—10 of FIG. 6 and depicting the adhesive assembly mechanism of the machine in detail.

FIG. 11 is a sectional view taken along line 11—11 of FIG. 10 and showing the block support structure of the adhesive applying mechanism.

FIG. 12 is a fragmentary isometric view depicting one of the corner support structures of the block support mechanism of FIG. 11 and showing in broken lines the relationship of a block of insulation material to the corner support mechanism.

FIG. 13 is a sectional view taken along line 13—13 in FIG. 10 and showing details of the block support guide mechanism.

Figure 6:
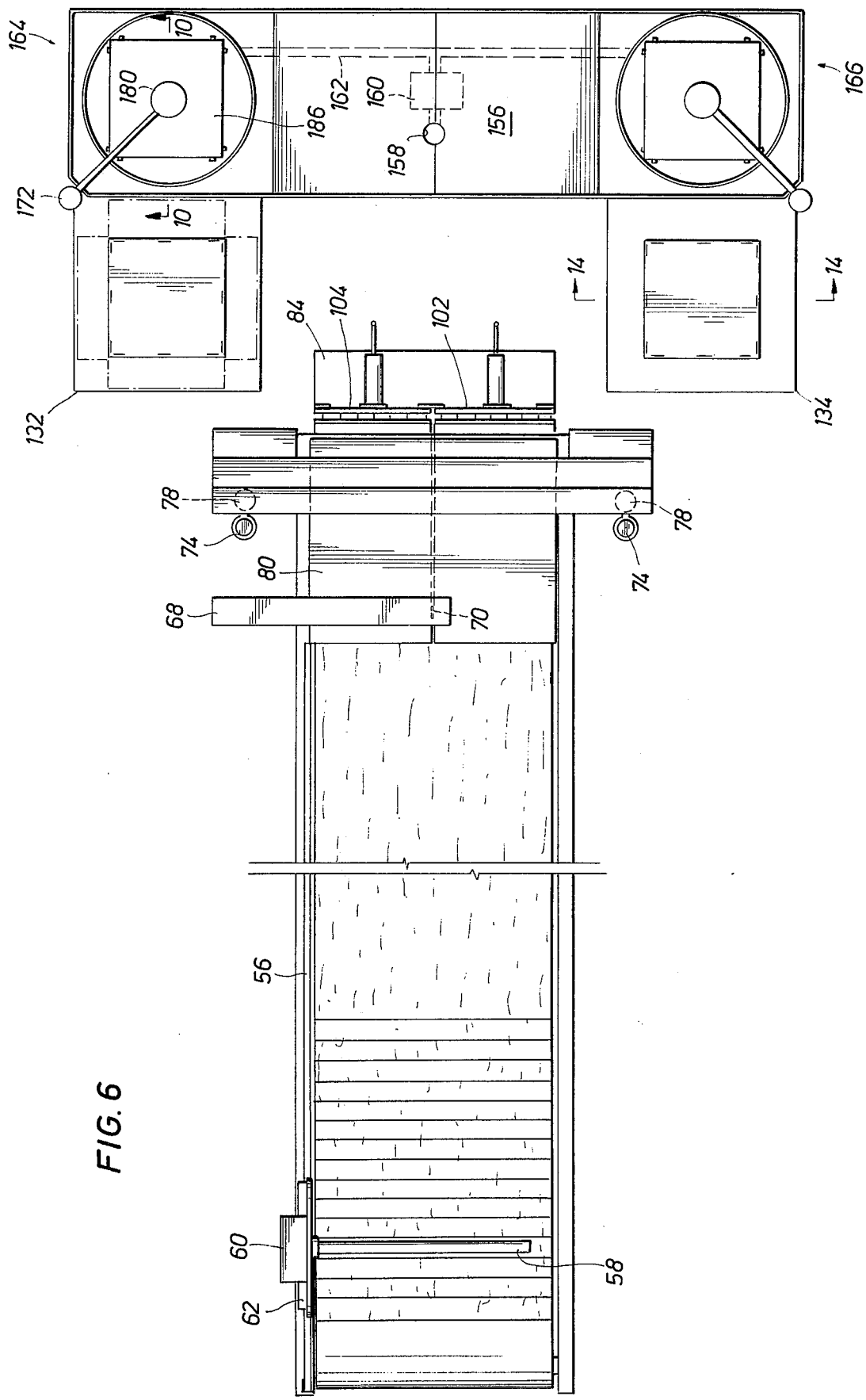

FIG. 14 is a sectional view taken along line 14—14 of FIG. 6 and depicting the structural details of the module assembly and wrapping station of the machine with a wrapping sheet and an assembled module positioned at the assembly station prior to injection of the module into the module receptacle.

FIG. 15 is a sectional view similar to the sectional view of FIG. 14 and depiting the position of the various components of the assembly station and receptacle after insertion of the module into the receptacle and folding of the wrapper about the top surface of the module.

FIG. 16 is a sectional view taken along line 16—16 in FIG. 15.

FIG. 17 is a fragmentary isometric view in exploded form depicting the wrapping paper and module alignment fingers of the module assembly station and showing a portion of the module wrapper being disposed above the alignment fingers.

Figure 18:
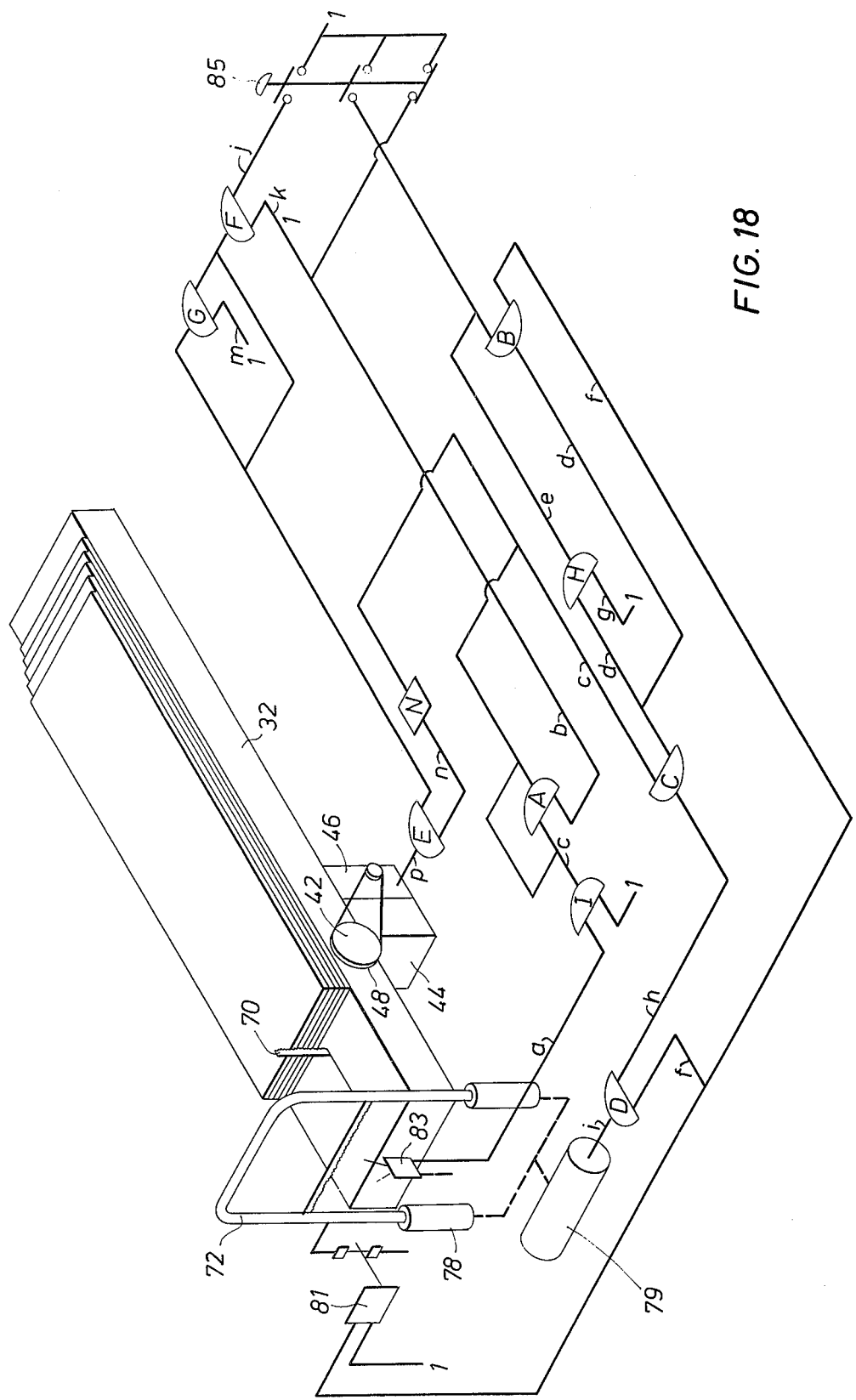

FIG. 18 is a schematic representation of electrical circuitry of the machine of the present invention from the standpoint of logic.

FIG. 19 is a graphical representation or truth table representing the characteristics of the various components of the electrical circuity from the stand point of logic at each of the operational cycles of the circuitry.

FIG. 20 is a schematic illustration of the logic characteristics of the "and gate" and "inverter" components of the circuitry of the present invention.

Figure 21:
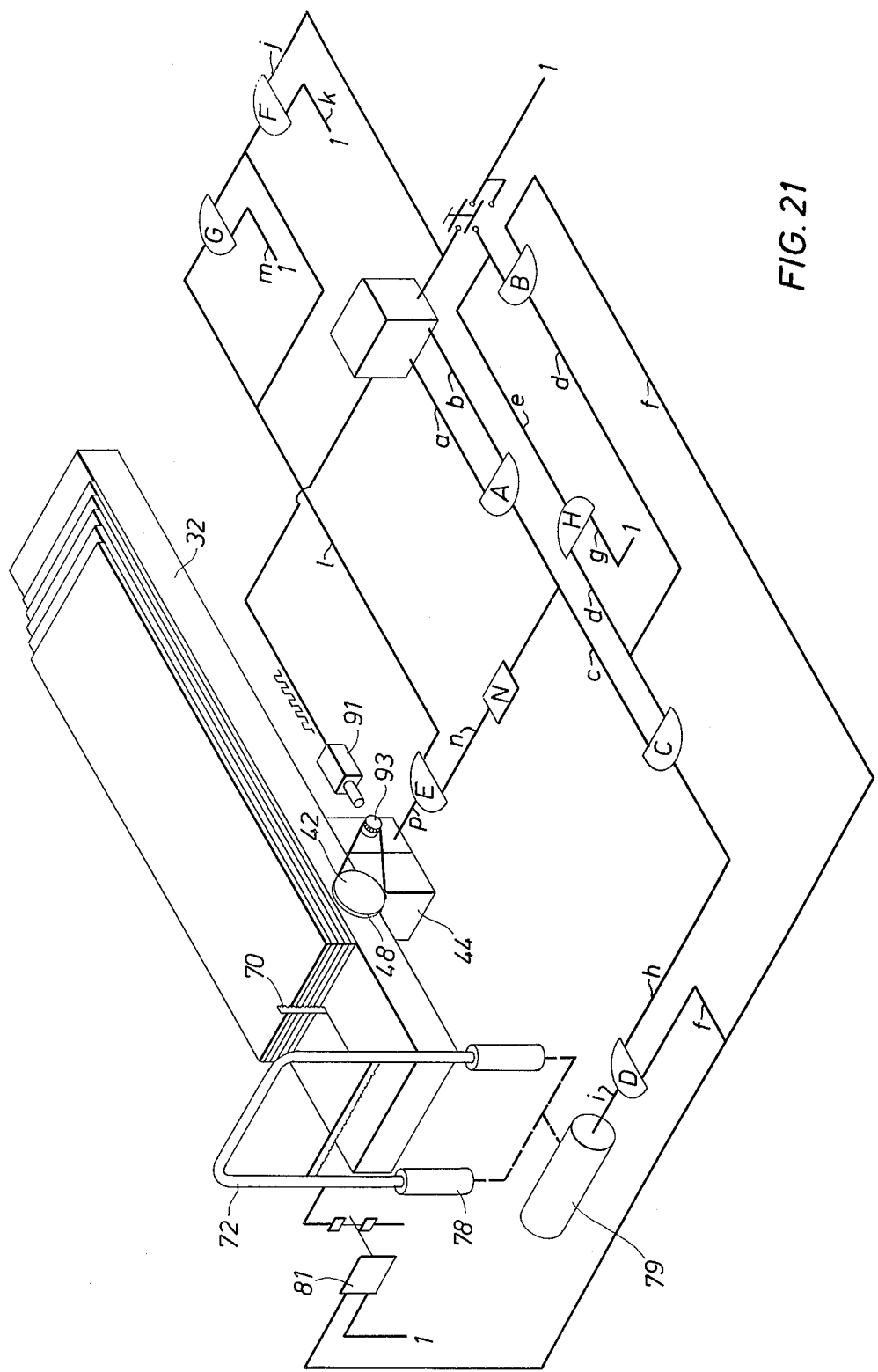

FIG. 21 is a schematic representation of electrical circuitry for the machine of the present invention, said circuitry representing a modified embodiment of the invention.

FIG. 22 is a graphical representation or truth table representing the characteristics of the various components of the electrical circuitry set forth in FIG. 21 from the standpoint of logic at each of the operational cycles of the circuitry.

FIG. 23 is a schematic illustration of the logic characteristics of the "and gate" and "inverter" components of the circuitry of the present invention.

DESCRIPTION OF PREFERRED EMBODIMENT

Figure 1:
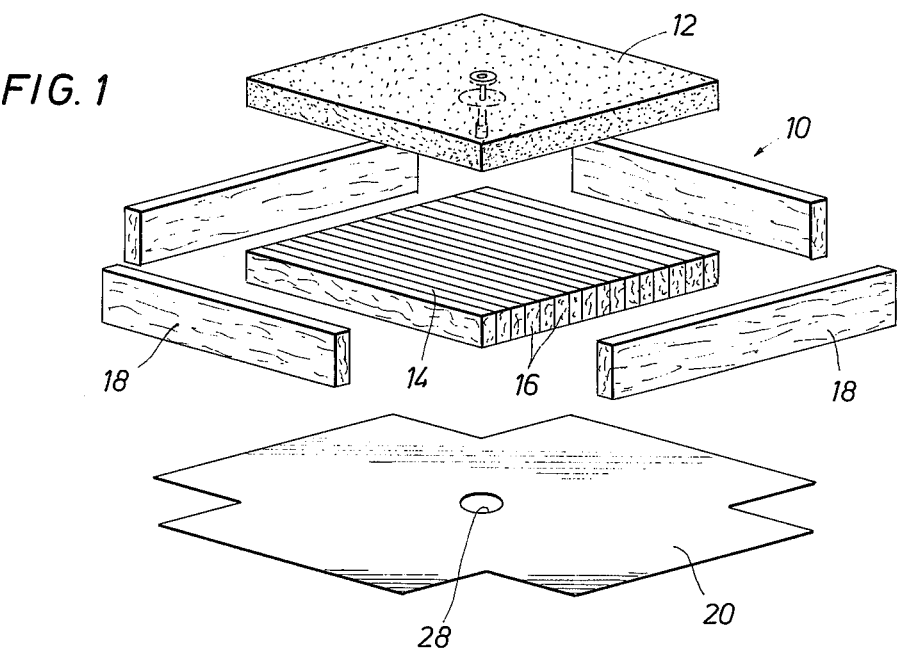

Now referring to the drawings and first to FIG. 1, there is depicted an insulation module generally at 10 that may incorporate a core 12 of generally rigid insulation material that may be of generally rectangular form, although such particular form is not required for purposes of the present invention. The rigid insulation block 12 which may be also referred to as a "mineral block" may be formed by a flat rectangular mineral block that is commonly known in the industry and which is available from a number of different manufacturers. One suitable mineral block structure that is commercially available, is referred to as "PV Supertemp" for purposes of illustration only, the mineral block or insulation block 12 may be in the order of two inches in thickness and approximately twelve inches by twelve inches, although other lengths and widths may be effectively employed, depending upon the size and configuration of the module that is desired. The above-mentioned dimensions of the insulation block will, when fully assembled with other components of the module, yield a module structure in the order of fourteen inches by fourteen inches square and having a thickness approximating four to five inches as will hereinafter appear.

A pad 14 of insulation material may be defined by accumulating a plurality of battens 16 of insulation material in side-by-side relationship such that the edge surfaces of the battens are exposed. The insulation material from which the battens 16 may be composed may be referred to as a ceramic fibrous material wherein the fibers of the material are arranged in flat layered form which, of the type commercially available, is regarded as having a recommended maximum operating temperature in the order of 2300° F. to 2400° F. A plurality of edge battens 18 composed of the same of similar fibrous insulation material as the fibrous insulation material of which the battens 16 are composed may be provided to define protective edges for the module structure. The edge battens 18 may be of the same thickness as the battens 16 but may be of a width substantially equaling the combined width of the rigid block 12 and the pad 14.

Assembly of the rigid block 12 and the fibrous pad 14 may be accomplished by bringing the block and pad into assembly in the presence of an adhesive material such as grout and assembly of the edge battens 18 to the block and pad assembly is accomplished in the same manner.

Figure 2:
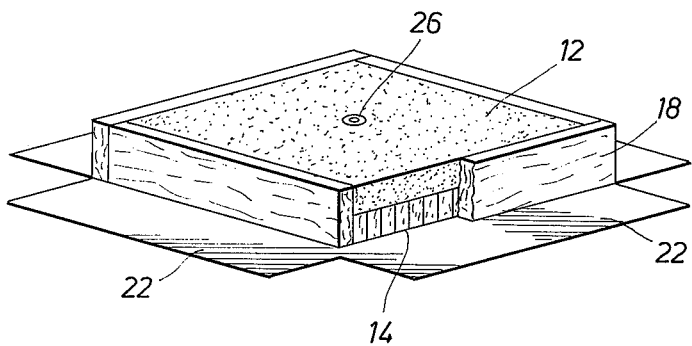
Figure 3:
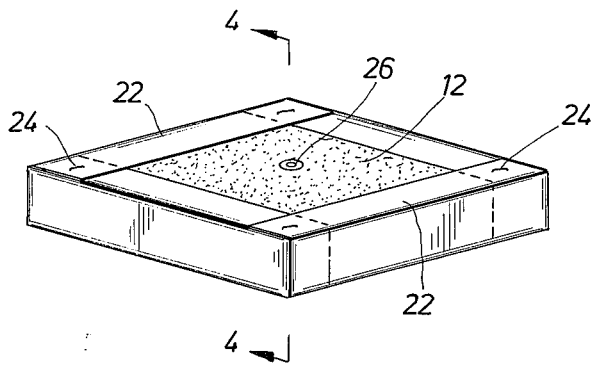
Figure 4:
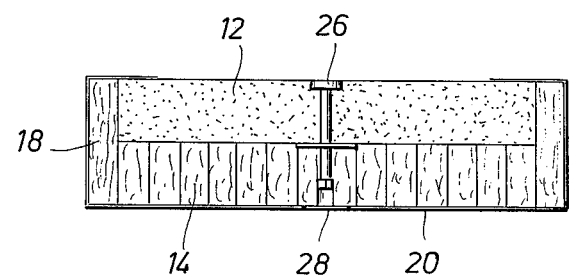

As illustrated in FIGS. 1, 2 and 4 a protective wrapping sheet 20 having a generally cruciform configuration may be provided upon which may be placed the components of the insulation module in the manner set forth in FIG. 2. During assembly of the module the exposed edges of the sheet shown in FIG. 2 will be folded about the module in the manner shown in FIG. 3 and the terminal portions of the edges 22 may be secured to the rigid block by a plurality of staples 24.

In the centermost portion of the rigid block 12 of insulation material may be provided an electrically conductive metallic stud 26 such as that set forth in U.S. Pat. No. 3,706,870 to Robert A. Sauder and Gary R. Kendrick. A portion of the stud 26 may be exposed at the inner or cold face of the insulation module and another portion may be exposed through an aperture 28 in the wrapper 20 at the outer or hot face of the module. Insulation modules constructed in accordance with the present invention may be secured to the wall structure of furnaces or the like simply by accomplishing welding of the studs to the wall structure of the furnaces. For an understanding of the technique employed for assembly of the insulation modules to wall structure reference may be had to U.S. Pat. No. 3,706,870.

Figure 5:
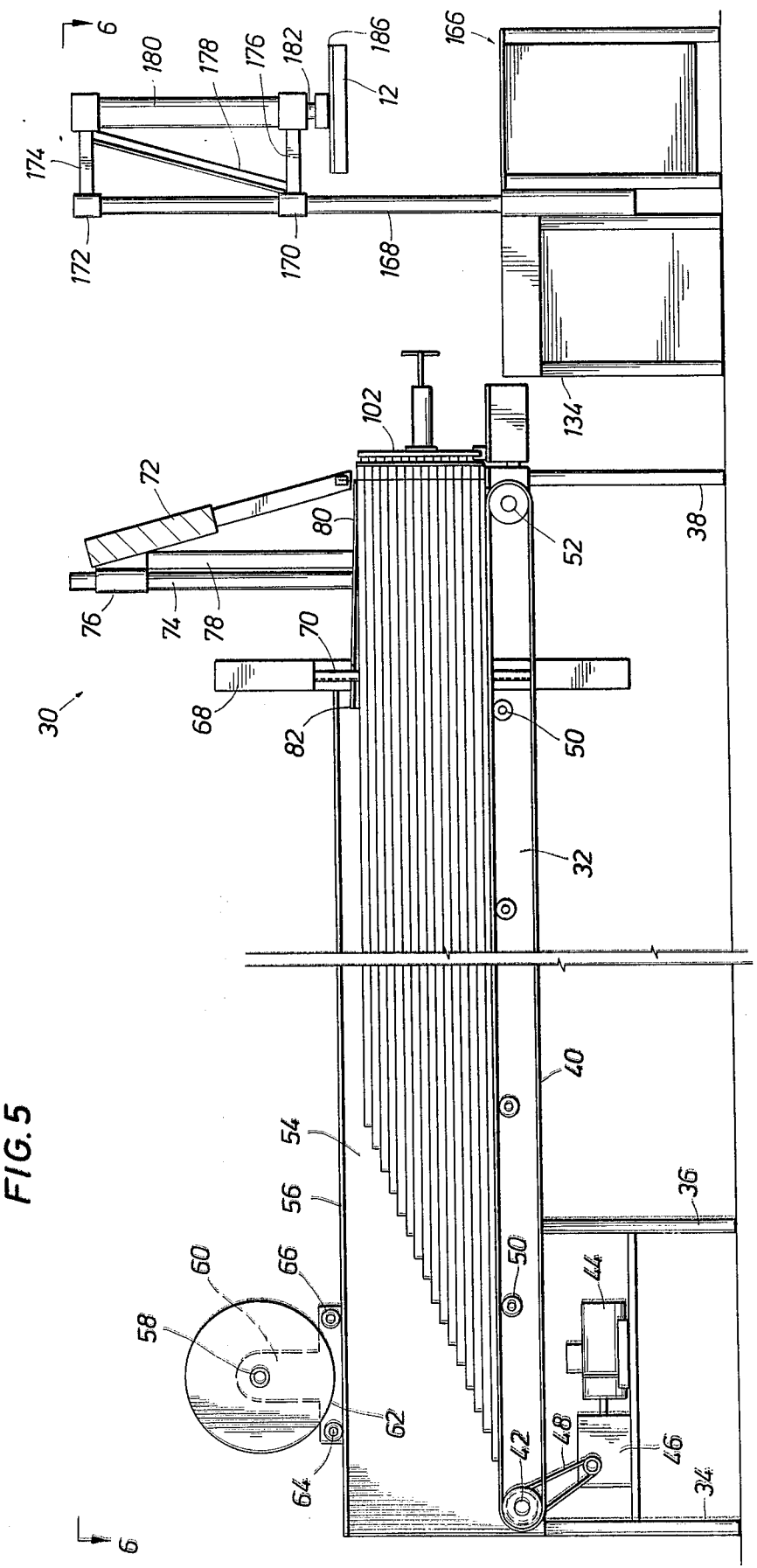

Referring now to FIG. 5, a machine for the manufacture of the insulation modules set forth in FIGS. 1-4 may be conveniently take the form illustrated generally at 30 wherein a belt-type conveyor mechanism 32 is shown to be mounted in generally horizontal position by a plurality of support legs such as shown at 34, 36 and 38. The conveyor 32 may incorporate an endless belt 40 that is driven by a drive roller 42 by a rotary electric motor 44 through a reduction gear mechanism 46 and a belt drive 48. The endless belt 40 is supported by a plurality of small idler rollers 50 and a large terminal idler roller 52.

A vertical wall structure 54 may be disposed adjacent the conveyor mechanism 40 and may have a track 56 defined at the upper portion thereof, which track is disposed in generally parallel relationship with the conveyor 40. In the manufacture of insulation modules it may be found desirable to provide a multi-layer stack of insulation material from which stack may be severed assembled pads of insulating battens as will be discussed in detail hereinbelow. Accordingly, a roll supply pin 58 may be supported in generally horizontal manner by a generally vertical support portion 60 of a roll carrier assembly 62 having track engaging wheels 64 and 66 at either extremity thereof. The roll carrier 62 is movable linearly on the track 56 in such manner as to allow the sheet material to be paid off from the supported roll onto the conveyor belt 40 during such movement of the carrier.

It is desirable to stack layers of insulation material onto the conveyor belt 40 in such manner that an additional linear multi-layer stack may be placed on the conveyor before exhaustion of the previous stack, thereby eliminating the necessity for shutting down the machine to replenish the multi-layer stack of insulation material. Continuous incremental movement of the multi-layer supply stack of insulation material will be thereby allowed and production of the machine will be substantially continuous.

If the multi-layer stacks of insulation material were placed end on end in such manner that a vertical joint would extend through the abutting preceding and following stacks, the vertical joint would interfere with production because the terminal portion of a preceding stack may not have sufficient structural integrity to withstand the effects of the severing operation. In order to provide structural integrity for the multi-layer stack of insulation material as the joint between preceding and following stacks are being subjected to transverse severing operations the various sheets or layers of insulation material may be supported on the conveyor in the manner illustrated in FIG. 5. Each of the trailing extremities of each of the sheets is staggered or stair stepped by a distance precisely equaling the width of the battens being severed from the stack and the length of the multi-layer stack of insulation material is such that each of the severing operations will accomplish severing precisely at the trailing extremity of each of the staggered sheets in order. As the stack of insulation material becomes exhausted to a certain point, additional layers of insulation material may be placed upon the conveyor belt 40 and may be arranged in juxtaposed relation with the trailing extremity of the respective layer of the preceding stack of insulation material. The stair stepped or staggered relationship of the joint that is established by stacking of the layers in this manner lends the multi-layer stacks of insulation material sufficient structural integrity to withstand the transverse severing operation.

As the stack of insulation material is fed incrementally toward one extremity of the conveyor mechanism 32 it may be desirable to sever the stack longitudinally in order that two or more accumulated insulating pads each composed of a plurality of battens of insulation material may be severed from the stack during each transverse severing operation. As depicted herein a single longitudinal severing device 68 which may conveniently take the form of a band saw having a band saw blade 70 may sever the stack in half thereby allowing the pads to be formed to be equal to one half of the width of the sheets of insulation material composing the multi-layer stack. If desired, depending upon the characteristics of the module to be formed and depending upon the size of the sheets composing the multi-layer stack, two or more linear severing devices may be employed thereby causing three or more pads of insulating material to be defined at each transverse severing operation.

As the stack of insulation material is fed toward one extremity of the machine, a transverse severing device 72 that may also conveniently take the form of a band saw may be disposed in such manner that a band saw blade supported and oriented thereby will make a vertical transverse cut through the stack of insulation material upon downward movement of the band saw mechanism. A pair of spaced generally parallel vertically oriented guide posts 74 may be supported by the machine structure and the band saw mechanism 72 may incorporate a pair of guide post receiver elements 76 that allow the band saw assembly to be moved vertically upon energization thereof by a hydraulic cylinder 78 disposed between the guide posts 74. After each movement of the multi-layered stack of insulation material the hydraulic motor 78 will be energized thereby imparting downward movement to the band saw mechanism 72 and causing that portion of the stack projecting beyond the plain defined by the band saw to be severed from the stack thereby defining the assembled pads of insulation material discussed above.

As the multi-layer stack of insulation material is fed the forward extremity of the stack enters a stack supporting and guide housing 80 that is slightly belled outwardly at the initial extremity 82 thereof thereby causing the layers of insulation material to be properly aligned at the precise height and width that is desirable for formation of insulating pads of proper dimension.

It will be desirable to remove the severed pads of insulation material as soon as the transverse severing operation has been completed and to transport each of the pads to various work stations of the machine for subsequent handling. One suitable means for retaining and removing severed pads of insulation material may conveniently take the form illustrated in detail in FIG. 7 where a platform 84 is shown to be disposed in movable relation with the conveyor mechanism 32 and the conveyor support structure of the machine by means of a pair of elongated support and guide bars 86 that extend through apertures 88 in the framework 90 of the machine structure and may be guided by appropriate portions of the machine structure as desirable. In the alternative, the guide bars 86 may conveniently take the form of operating stems of hydraulic cylinders such as shown in broken line at 92 thereby allowing the platform 84 to be movable upon energization of the hydraulic cylinder. A central support element 94 may be welded or otherwise secured to the movable support platform 94 and may be braced relative to the platform by an angulated brace element 96 that is also welded to the platform structure. Side support elements 98 and 100 may also be welded or otherwise secured to the movable support platform and, like the central support structure 94 will absorb thrust loads applied to at least one and preferably a pair of pad support fixtures such as shown at 102 and 104. Edge receptacles 106 may be provided to receive the lower portion of the respective pad retaining fixture thereby cooperating with the central support 94 and the set supports 98 and 100 to retain the fixtures 102 and 104 in proper supported position on the movable platform.

Figure 7:
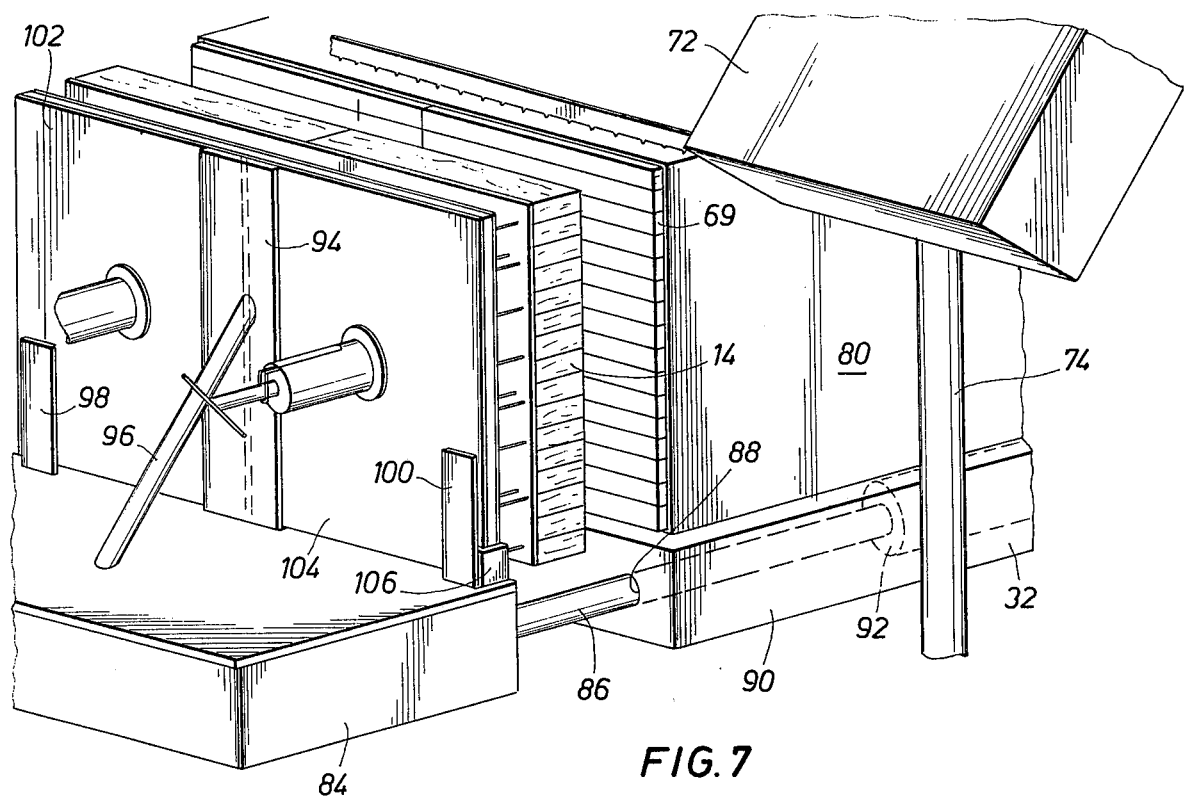

As illustrated in FIG. 7 the platform 84 is shown to be retracted in such manner as to move the pad 14 of insulating material that has been severed by the band saw mechanism 72 from the stack 69 of insulation material. Movement of the platform 84 to the position illustrated in FIG. 7 may be accomplished manually if the rods 86 merely serve as guide rods or may be accomplished hydraulically in the event the rods 86 define the actuating stem of a hydraulic cylinder such as shown in broken line at 92.

Figure 8:
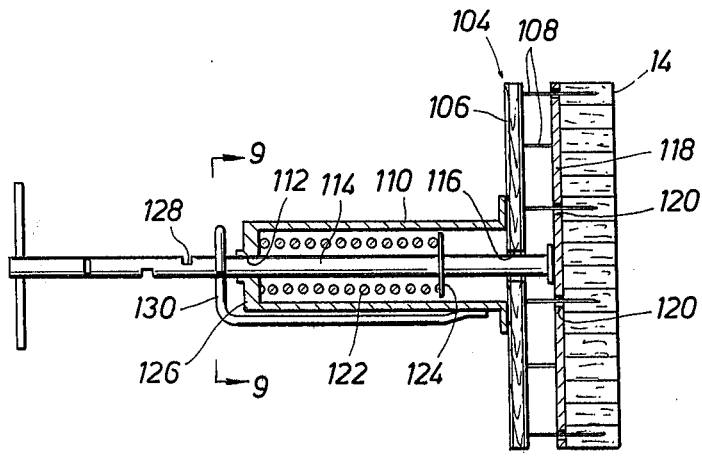

Referring now to FIG. 8, each of the fixtures, illustrated generally at 104 may include a body plate 106 such as might be formed by a rectangular sheet of material such as wood or any other suitable substance from which may extend a plurality of pad impaling pins 108. With the pins 108 directed toward the stack of insulation material being fed and with the fixtures being retained by the platform the pins 108 will become extended into the fibers of the insulation material upon incremental feeding of the stack of insulation material. After the severing operation has taken place the pad of insulation material defined by an accumulation of battens of similar size will be retained by the fixture and may be withdrawn to the position illustrated in FIG. 7. A spring housing 110 may be secured to the body plate 106 in any desirable manner such as by screws of the like and may have an aperture 112 at one extremity thereof through which may extend a shaft 114 that also extends through an aperture 116 defined centrally of the body plate 106. A pad ejection plate 118 having a plurality of apertures 120 defined therein, each aperture receiving one of the impaling pins 108 may be secured to one extremity of the shaft 114 and may be movable relative to the body plate 106 and the impaling pins 108 upon movement of the shaft. Within the spring housing 110 may be disposed a compression spring 122 that surrounds the shaft 114 and bears at one extremity upon a stop element carried by the shaft 114 while the opposite extremity of the compression spring engages the inner surface of a transverse wall 126 of the housing structure.

The normal effect of the compression spring 122 is to urge the shaft 114 to the right as illustrated in FIG. 8 thereby causing the ejector plate 118 to move outwardly relative to the impaling pins 108 and thereby separate the pad 14 from the impaling pins.

Figure 9:
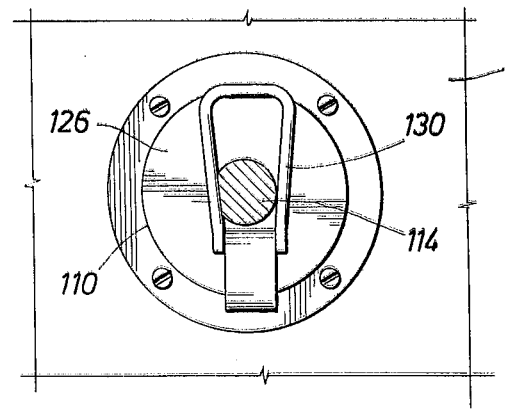

Beyond the spring housing 110 the shaft 114 may be formed to define a plurality of locking recesses 128 within which may be received a shaft locking device 130 having one portion thereof secured to the housing 110 by welding or the like. As illustrated in FIG. 9 the upper extremity of the locking element 130 is bent back upon itself in such manner as the define an opening that is larger at one extremity than at the opposite extremity thereof. When the locking element 130 is in the position illustrated in FIG. 9 a portion of the locking element may enter one of the locking grooves 128 in the shaft 114 thereby locking the shaft against movement. The locking element 130, being a resilient movable device may be moved to a position allowing the larger internal portion of the opening to be presented to the shaft and thereby causing the shaft to be released upon such movement. The shaft 114 may be rotated to align various ones of the locking grooves 128 with the locking element 130, depending upon the particular relative positions of the ejection plate 118 and the impaling pins 108. For example, if a relatively thin pad of insulation material is to be severed from the stack of insulation material the shaft 114 may be oriented in such manner that the locking device 130 will enter a locking groove and thereby lock the fixture mechanism in the position illustrated in FIG. 8. In the event a thicker pad of insulation material is to be severed, it may be desirable to lock the fixture mechanism in such position that the impaling pins 108 extend further through the apertures 120 thereby allowing the impaling pins to be inserted further into the thicker insulation material.

After the pads 14 of insulation material have been severed from the stack of insulation material and have been secured to one of the fixtures 102 or 104 it will be desirable to transport the pad to an assembly station for assembly of the pad together with other components into an insulation module. As illustrated in FIG. 6, the machine structure 10 may incorporate a pair of assembly stations 132 and 134 thereby allowing the two fixtures 102 and 104 to be manually transported immediately following a severing operation to respective ones of the module assembly stations. As shown in FIGS. 14-17, each of the pad assembly stations may incorporate a support plate 136 upon which the pad of insulation material may be placed. At each module assembly station there may be provided a module assembly structure including a generally rectangular receptacle structure 138 having a wrapper support flange 140 supported thereby. The module support plate 136 may be secured to the actuating stem 142 of a hydraulic cylinder 146 having a pistion 148 disposed within the cylinder and being movable in either direction by hydraulic fluid to impart movement to the stem 142 and the module support plate 136.

It will be desirable to precisely locate the pad of insulation material 14 at the assembly station and such may be accomplished by means of a plurality of pad locator fingers 150 that may extend upwardly from the module support plate 136. With the pad of insulation material secured to one of the fixtures 102 or 104, the pad will be of proper size and configuration to be received within the area of the module support plate 136 bounded by the pad locator fingers 150. After the pad has been brought into proper assembly with the module support plate 136 the locking mechanism of the fixture may be released, thereby allowing the compression spring 122 to move the ejector plate 118 outwardly relative to the impaling pins 108 and eject the pad from the fixture. The locator pins 150 also serve to locate a sheet 152 of wrapping material at the module assembly station. The sheet of wrapping material may be provided with a plurality of openings 154 that may be oriented in corresponding relation to the pad retaining fingers 150 in the manner illustrated in FIG. 17, thereby allowing the fingers 150 to extend through the openings 154 as the sheet of wrapping material is positioned immediately prior to positioning of a pad of insulation material in receiving relation within the surface area of the plate 136 that is bound by the fingers 150. Wrapping of the module being manufactured with a protective wrapping composed of wrapping material 152 will be discussed hereinbelow in connection with final assembly of the insulation module.

With a pad of insulation material positioned properly on the module support plate 136, it will be desirable to transport a generally rigid core or block of insulation material such as mineral block to the module assembly station and to secure the block in assembly with the pad in the presence of an adhesive material such as grout. It will be desirable to coat blocks of insulation material with the adhesive material immediately prior to assembly of the respective modules and it will be desirable to achieve coating of one of the side surfaces of the module and substantially all of the side surfaces thereof. As shown in FIG. 6 of the module manufacturing machine of the present invention may incorporate a single adhesive containing vat 156 that is of essentially V-shaped configuration and having an outlet opening 158 disposed at the lowest portion of the vat. A pump 160 illustrated in broken line is disposed below the vat 156 with the suction side of the pump connected to the discharge opening 158 of the vat while the discharge portion of the pump 160 may be communicated to a conduit 162 that transports the adhesive material to a pair of adhesive application stations illustrated generally at 164 and 166. At each of the two adhesive application stations there may be provided a generally vertical support post 168 carrying pivot support elements 170 and 172 about which a cylinder support framework 174 may be pivotally secured. The frame work 174 may incorporate a pair of generally parallel horizontal elements 174 and 176 and an inclined transverse brace 178 that lends triangular structural rigidity to the cylinder support structure. A hydraulic cylinder 180 may be secured to the framework 174 and may have an operating stem 182 to which a rigid box support fixture 184 may be secured. The fixture 184 may incorporate a block support plate 186 having a plurality of spikes 188 carried thereby, which spikes may be inserted into a mineral block insulating and backing element 12 that may form the core of a modular insulating structure. The hydraulic cylinder 180 is adapted to pivot about the pivot supports 170 and 172 through an arc of approximately 90° that transports the mineral block from a position disposed above the adhesive application station to a position disposed above and properly aligned with a pad of resilient material disposed at the assembly station.

As illustrated in FIG. 10, each of the adhesive assembly stations may be designed to create a substantially continuous flow of adhesive material that prevents the adhesive material from beginning to cure or set before application thereof to a mineral block that is to be immediately assembled with other insulator components to form a modular insulator. One suitable adhesive material that has been found to produce satsifactory results is a grout material that remains uncured and in the form of a fairly viscous liquid material as long as movement of the material is continued but which sets quite rapidly upon termination of movement of the liquid to form a masonry like bond between the various components of the module structure. The conduit 162 extending from the discharge side of the pump 160 may be connected to the bottom portion of an enclosure 190 thereby allowing the grout to be pumped into the enclosure where it may flow upwardly through an aperture 192 in a generally cylindrical portion 194 of a movable block support structure that is disposed in guiding relation with an annular flange 196 defined by a portion of the wall structure of the adhesive container 198. The grout or adhesive material will continue to flow upwardly within the cylindrical wall structure 194 and will exit from the cylinder through a circular opening 200 and flow into the adhesive container 198. The adhesive container will be disposed within the upper portion of the adhesive containing bin 156 and the adhesive material continuously pumped through the circular adhesive distribution opening 200 into the adhesive container 198 will overflow the adhesive container and fall back into the adhesive bin. Thus, grout or other suitable adhesive material is continuously circulated in the adhesive applying system of the machine and the curing or setting rates of the grout or adhesive is thus effectively retarded until the grout is actually applied to the surface area of the block 12.

Within the cylindrical wall structure 194 may be provided a generally cylindrical cup hving a cylindrical wall 202 that may be secured to the cylindrical wall structure 194 by means of a plurality of spacer elements 206. The cylindrical cup may also include a generally planar bottom wall 208 cooperating with the cylindrical wall 202 to define a dead space into which may be inserted the depending portion of the stud 26 thereby preventing the stud from coming into contact with the adhesive material as the block 12 is inserted into the adhesive container 198 in the manner described hereinbelow. A pair of depending guide rods 210 and 212 may be secured to the lower wall structure 212 of the movable cylindrical element 194 and may extend through apertures formed in a pair of guide elements 214 and 216 that may be secured internally of the container 190. A compression spring 218 may be inerposed between the lower wall 212 of the cylindrical element 194 and the upper guide element 214, thereby imparting a force to the cylindrical element 194 that maintains the cylindrical element at an uppermost position thereof unless a down force is applied thereto.

At the upper portion of the cylindrical wall 202 defining the inner cup may be connected a plurality of block support elements 220 having corner receiving devices 222 formed at each extremity thereof and disposing a pair of vertical projections 224 and 226 that engage edge surfaces of the block 12 in order to positively locate the block and maintain its sability during insertion of the block into the ahdesive material of the container. Projections 228 may be provided on each of the support elements 220, which projections may engage the lower surface of the block 12, thereby supporting the block above the support elements 220 and causing all but an insignificantly small portion of the exposed surface area of the block to be effectively coated with adhesive material as the block is inserted into the adhesive.

After the hydraulic cylinder 180 has been disposed above the adhesive coating station, the cylinder is activated thereby causing the block supporting fixture 184 and the block 12 to be lowered into assembly with the support elements 220 in such manner that the corners of the block are received by the corner support elements 222 in the manner shown in broken line in FIGS. 11 and 12. As the hydraulic cylinder continues to impart downward movement, the compession spring 218 is compressed and the cylindrical element 194 is caused to move downwardly with positioning of the cylindrical element and the block support assembly being controlled by co-activity of the guide flange 196 and the guide rods 210 and 212. When the block 12 has been inserted fully into the container 198 the upper level of the adhesive material within the container will have risen to the upper surface of the block thereby coating the bottom side surface of the block and the edge surfaces thereof with the adhesive grout.

After the mineral block of insulating material has been properly coated with the grout material it will be desirable to transport the mineral block to the module assembly station and to bring it into assembly with a pad of insulating material being retained at the assembly station. The hydraulic cylinder 180 is energized in such manner as to raise the fixture 184 and the block 12 from the grout in the container 198 and the cylinder will be caused to pivot 90° about the pivot elements 170 and 172 thereby disposing the grout coated block immediately above a pad of insulation material at the module assembly station 134. The hydraulic cylinder may again be energized in such manner as to lower the block into assembly with the pad essentially as shown in FIG. 14. At this point in the assembly process edge battens 18 may be brought into assembly with the edge surfaces of the assembled block and pad, the inner surface of the edge battens being secured to the block by the grout coated on the edge surfaces of the block. It will be desirable to maintain the assembled components of the module under compression for at least a portion of the curing time of the adhesive material and, according to the present invention such may conveniently accomplished by activating the hydraulic cylinder 180 thereby causing the plate 186 of the fixture 184 to force the module downwardly into the receptacle 138 thereby placing the module under initial compression. The hydraulic cylinder 146, disposed below the receptacle and having its module support plate disposed within the receptacle may be arranged to apply only enough force to create a certain degree of module compression, the cylinder 146 being overpowered by the hydraulic cylinder 180 as the module is forced into the receptacle 138.

As the module is forced into the receptacle, the four side portions of the cruciform sheet of wrapping material will be folded about the edge surfaces of the module. A plurality of wrapper folding devices 230 may be retained within apertures 232 formed in the wall structure of the receptacle. The folding devices 230 may be pivoted such as at 234 and may be provided with an actuating projection 236 that may be secured by a tension spring 238 to the sheet support flange 140. Tapered surfaces 40 may be defined on each of the sheet folding elements 230 which serve to cam the folding elements out of the way of the module support structure as the module moves downwardly under the influence of force applied by the hydraulic cylinder 180. A support skirt may be provided in assembly with the module support plate 136 and may serve the dual purpose of preventing the sheet folding device 230 from being pivoted outwardly under the influence of the tension spring 238 when the module is raised to the position illustrated in FIG. 14 and providing a stop to limit downward movement of the module support plate in the manner illustrated in FIG. 15.

After the module has been moved downwardly to the position illustrated in FIG. 15 the hydraulic cylinder 146 will be maintained in its inactive or retracted state and the block support fixture 184 will be separated from the block and moved upwardly out of the receptacle 138 thereby allowing the sheet folding element 230 to be pivoted by the tension spring 238 to the position shown in FIG. 15, thereby folding the terminal edges of the sheet of wrapping material about the upper surface of the module and into juxtaposition with the upper surface of the mineral block 12 with the folding devices 230 disposed as shown in FIGS. 15 and 16, it should be noted that the corner portions of the folded sheets may be exposed. Stapling apparatus is then brought into contact with the corner portions of the sheet material and a staple is inserted in each corner as shown at 244, which staple extends through the overlapping layers of wrapping material and into the upper surface of the mineral block.

In order to move the block supporting fixture 184 upwardly relative to the mineral block in position within the receptacle, it is necessary to extract the spikes 188 from the mineral block. The actuating stem 182 of the hydraulic cylinder 180 may be secured to a housing structure 246 that is in turn secured by bolts 248 or other suitable connecting devices to the horizontal plate 186. A hydraulic cylinder 250 may be disposed within the housing 246 and may incorporate a piston 252 having an actuating stem 254 that extends through an aperture formed in the lower wall 256 of the cylinder and bears upon the upper portion of the module connection stud 26. Application of fluid pressure to the hydraulic cylinder 250 will cause the actuating stem 254 of the piston to bear downwardly upon the stud 26 which, acting through the mineral block 12 will impart a force that extracts the spikes 188 from the mineral block thus separating the mineral block support 184 from the module structure.

After the protective wrapper has been secured to the module structure by stapling, the hydraulic cylinder 148 will be activated thereby causing the module support plate 136 to be moved upwardly thereby causing ejection of a completed module from the receptacle 138. The protective wrapping material will maintain the module under a certain degree of mechanical compression during the remainder of the curing or setting time of the adhesive grout material. The protective wrapping material also serves to maintain the module in a clean and protected condition during all phases of handling prior to installation of a module to the wall structure of a furnace or other such enclosure.

Referring now to FIG. 18, there is depicted a schematic representation of the electrical circuitry of the present invention, said circuitry being shown in logic form and/controllably related to the various mechanical features of the machine. By correlating FIGS. 18, 19 and 20, the logic conditions of the components of the circuitry may be identified during each of the various conditions of the control circuitry.

There may be a number of non-variable logic input signals and these are identified in the circuit diagram of FIG. 18 by the number 1. For example, input signals $g$ and $q$ are logic input signals, either 1 or 0, depending upon the condition of electromechanical components. For example, the limit switch 81 is related to the cut-off saw mechanism 72 and is operative in the first position thereof to cause introduction of a logic signal 1 and in the second position thereof to cause introduction of a logic signal 0. Likewise, the spring return micro-switch 83, the movement of which is controlled by the positions of the conveyor mechanism 32, is also to movable to cause introduction of either logic signals 1 or 0, depending upon whether the micro-switch is in the full or broken line positions thereof. On-off switch 85 is also operative to cause introduction of logic 1 or logic 0 signals in combination, depending upon the particular position of the switch.

With reference to FIG. 19, the vertically oriented "power on" portion of the truth table depicts the condition of each portion of the logic circuit in the energized condition of the control circuitry of the machine. Before initiation of an operating cycle.

In the first logic block of the truth table in a section referred to as the "power on" section a logic signal 0 will exist. In logic circuit $a$ because the spring return micro switch 83 will be at the full line position thereof, thereby causing a logic signal 0 to be conducted to the "and gate" I. Since a logic 1 signal will be conducted through circuit $g$ to the "and gate" I, the output signal "C" from the "and gate" will be a 0 because in FIG. 20, a 0 signal plus a 1 signal will equal 0. The "end gate" A will also have an output signal of 0 because of the input signal of 0 of $c$ and the 1 signal input at $b$ that is caused by 1 input through the lower contact of the cycle initiation switch 85. Circuit $e$ will also have an output of 0 because of the 0 input to "and gate" B through the middle conductor of switch 85 and because of the 0 output of "D" which is an input to both of the "and gates" H and C.

Before closure of the upper and middle contacts of switch 85, shown open in FIG. 18, circuits B, F and G will have a logic 1 condition, circuit "B" being energized through the closed lower conductor of switch 85, circuit $g$ having a non-variable input of 1 and circuit "F" being energized through the limit switch 81 and also having an input of 1. Circuit $h$ at this time will have a condition of 0, determined being by the 0 output of "and gate" C. Circuit I will also have the logic condition of 0, being the output signal of "and gate" D, which has a 1 input at "F" and a 0 input at $h$. Circuit "J", being a connection between the open upper contact of switch 85 and one of the inputs to "and gate" F, will also have a condition of 0 while circuit $k$, being the other input to "and gate" F is shown to have a logic input of 1. Referring to FIG. 20, the logic 0 of "J" and logic 1 of "K" being input to the "and gate" F results in an output signal 0 which is fed to the "and gate" G. This signal, coordinated with the logic 1 input of circuit "M" to "and gate" G results in an output signal of 0 that is fed to "and gate" E, thereby providing an output signal of 0 at "P".

The output signal of "and gate" I, being produced by input signals 1 from "G" and 0 from $a$, results in an output signal of 1 which is fed "and gate" A along with input signal 1 from "B" thereby resulting in an output signal 0 that is conducted to the inverter N. This causes circuit "N" to have a logic signal 1 that is fed into "and gate" E along with signal 0 from the output signal of "and gates" F & G to cause a 0 signal to occur at "P".

It is clear, therefore, that by utilization of the truth table set forth in FIG. 19 in correlation with the "and gate" and inverter determinations set forth in FIG. 19, the logic characteristics of each of the particular components of the control circuitry may be readily identified.

Momentary closure of the push button type switch 85 will cause the logic circuitry to become instantly altered to condition illustrated in the "push-run advance conveyor" portion of the truth table set forth in FIG. 19. The various components of the logic circuitry may be determined in the same manner as discussed above in connection with the "power on" portion of the truth table. When the switch 85 is closed, the conveyor 32 begins to advance the stack of material toward the cutoff saw 72 and, upon reaching a predetermined position, the stack of material or the conveyor mechanism will actuate the micro switch 83 to the broken line position thereof, thereby causing a logic signal 1 to be introduced to "and gate" I along with the logic signal 1 from "Q" which causes the output signal of "and gate" I to change from 0 to 1. The effect of this change is to cause the cutoff saw mechanism 72 to move downwardly, severing the material until limit switch 81 is actuated to introduce a logic signal of 0 to circuit "F". At this point the pump 79 energizes the cylinder 78, thereby causing the saw mechanism to return to its uppermost position. After the cutoff saw has raised to its uppermost position, the logic circuitry will have changed to the end of cycle condition thereof.

In FIGS. 21, 22, and 23, there is depicted control circuitry, a truth table and a signal identifying code, representing circuitry that is slightly modified, as compared to the circuitry illustrated in FIG. 18. While the circuitry is energized through actuation of limit and micro switches as shown in FIG. 18, the circuitry illustrated in FIG. 21 differs in that control is achieved at least in part through the control functions of a preset pulse counting mechanism with pulses being generated by an electromagnetic pulse generator 91. The pulse generator is responsive to the proximity of the teeth of the output gear 93, as the gear rotates, to generate a number of pulses related directly to the number of teeth of the gear. The preset counter circuit, receives the pulses and, upon counting a predetermined number of the pulses, generates a logic signal that is utilized for control function in the same manner as discussed above in connection with FIG. 18.

It should be noted that the preset counter will render a logic signal of 0 until it reaches the predetermined pulse count for which it is set and whereupon it renders an output signal of 1 that is transmitted to the input portions of the various and gates as shown in the schematic diagram of FIG. 21.

The logic conditions of the various components of the control circuitry illustrated in FIG. 21 may be determined in the same manner as discussed above, by utilizing the logic identification characters set forth in FIG. 23. The cut-off saw mechanism 72 continues to be controllably operated in the same manner as discussed above with cycle changes that are readily identified by reference to the truth table set forth in FIG. 22.

OPERATION

Ceramic fiber material supplied in rolls may be placed onto the conveyor belt 40 of the machine in stair stepped, staggered relationship as shown in FIG. 1 by moving the roll transporting carrier 62 linearly on the track 56 while allowing the fibrous material to pay out from the roll. The vertical wall or back stop 54 serves as a guide to maintain the various layers of ceramic fiber in alignment with one another. The stair stepped or staggered manner in which the ceramic fiber is made to form effectively allows a subsequent stack of ceramic fiber layers to be positioned in assembly with another stack of ceramic fibers layers with no interference or waste resulting from passage of the joint between the stacks through the severing mechanism of the machine.

The machine may incorporate an electrical power and control system wherein power is transmitted through a control panel to all of the electrical equipment on the machine. The machine may be controlled at least in part by an electromagnetic transducer that transmits a digital signal to circuitry of the control panel which generates pulses of voltage proportional to the distance traveled by the conveyor of the machine.

The receiver of the voltage pulses may be effectively adjusted to stop the conveyor after a predetermined distance has been traveled by the conveyor. In the alternative, it may be desirable to control incremental stopping of the conveyor by a simple conventional stop circuit including a limit switch that is actuated upon predetermined movement of the stack of material supported by the conveyor. As the stack of material is being conveyed into a ceramic fiber guide housing 80 the stack is split longitudinally thereby defining two longitudinal stacks of equal dimension.

After the circuitry has been energized, the conveyor advances the stack of ceramic fiber through the ceramic fiber guide chute or housing and the split stacks of ceramic fiber are maintained in proper alignment and configuration by the housing 80. The ceramic fiber stacks continue to be advanced through the discharge opening of the housing or guide chute 80 while bending impaled onto the impaling pins of two ceramic fiber transfer fixtures. The advancement of ceramic fiber forces the platform 84 by which the transfer fixtures are retained outwardly until the platform has moved a predetermined distance. When the predetermined movement of the platform has been reached, the conveyor will be stopped by the circuitry of the control system of the machine and a cross cut saw will be lowered thereby separating a predetermined length of ceramic fiber from the stack of ceramic fiber layers and thereby creating an insulating pad composed of a plurality of identical ceramic fibers battens. After the cross cut operation has been accomplished, the transfer fixtures may be removed from the machine and transported to an assembly area with the transfer fixture remaining in its cocked position with the impaling needles extending a desirable distance through the pad ejection plate 118. After positioning of the pad of insulation material at the assembly station, the locking element 130 of the fixture may be manipulated in such manner as to release the shaft 114 thereby allowing the shaft to move the ejection plate 118 outwardly relative to the pins 108 thereby extracting the pins from the pad of insulating material.

After a rectangular mineral block of insulating material has been attached to a block transporting mechanism, the transporting mechanism may be actuated in such manner that the block may be lowered into a contained quantity of continuously circuating grout material whereby a side surface and all of the edge surfaces of the block may be coated with the grout material. The block transporting mechanism then may be energized to raise the block from the grout material and may be rotated substantially 90° thereby aligning the block with the module assembly station.

After lowering of the coated mineral block into assembly with the pad at the module assembly station edge battens of ceramic fiber may be applied to complete the module structure and the module may be injected into a receptacle that causes application of mechanical pressure to the various components of the module structure. Simultaneously, a wrapper of protected material is folded about the module in the compressed condition thereof and may be stapled about the module structure. After the module has been ejected from the receptacle, the protective wrapping will maintain the module under a certain degree of mechanical compression until the grout material has become fully cured.

Although the present invention has been described particularly as it relates to a process and machine for manufacture of insulating modules it will be observed by one experienced in the art that other machines may be effectively employed within the spirit and scope of the present invention to manufacture such insulation modules. For example, instead of slicing through a stack of ceramic fiber layers to define an insulating pad, it may be desirable to provide a mechanism for cutting identical battens of material and subsequently assembling the same into a pad of similar type and size. It is intended therefore that the present invention be of sufficient breadth to include such machine structures. The invention therefore is described in relation to a certain specific embodiment, but it will be understood that this is intended by way of illustration only and that various changes may be made in the structure and arrangements of the machine and the process within the spirit and scope of the present invention.

It is therefore seen that this invention is one well adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A process for the manufacture of insulated enclosure liner modules, said process comprising:
    severing from a stack of sheets of fibrous insulation material a plurality of generally rectangular battens of substantially similar size and disposed in side to side relationship, each of said battens being composed of a thickness of fibrous insulation material and having side and edge surfaces, said edge surfaces being of smaller dimension than the dimension of said side surfaces, said battens cooperating to define a pad of insulating material;
    forming a fibrous pad of generally rectangular configuration, the edge surfaces of said battens being exposed at the side surfaces of said pad;
    providing a substrate of a dimension corresponding to the dimension of said pad and supporting said substrate;
    coating at least one of the side surfaces of said substrate with an adhesive material;
    securing a connecting member to said substrate prior to assembly of said substrate and said fibrous pad, said connecting member extending from a coated surface of said substrate;
    protecting said connecting member from said adhesive material during coating of said substrate;
    bringing said pad unit into intimate engagement with said coated surface of said substrate; and
    retaining said pad unit and substrate in a state of compression during curing of said adhesive material.

2. A process as recited in claim 1, wherein said coating includes coating the side edges of said substrate with said adhesive and said process includes:
    providing a plurality of edge battens of fibrous insulation material;
    securing said edge battens of fibrous insulation material to each of the edge surfaces of said fibrous pad by bringing the same into assembly in the presence of said adhesive material; and maintaining said pad, said substrate and said edge battens under mechanical pressure during curing of said adhesive material.

3. A process as recited in claim 1, wherein:
said substrate comprises a block of material having side surfaces of substantially the same size as the side surfaces of said fibrous pad; and
at least substantially enclosing said module with a protective wrapper, said wrapper maintaining said module under mechanical compression.

4. A process as recited in claim 3, wherein said module is enclosed in a protective wrapper by:
locating protective wrapping material relative to a module assembly station prior to assembly of said pad and said block;
placing said pad at said module assembly station on top of at least a portion of said wrapping material;
bringing said block into assembly with said pad thus forming said module;
forcing said module and wrapping material into a folding receiver thus simultaneously folding portions of said wrapping material about said module and mechanically compressing said module; and
securing said folded portions of said wrapping material about said module.

5. A process as recited in claim 3, wherein:
said securing of said folded portions of said wrapping material is accomplished by forcing staples through said wrapping material into said block to retain said wrapping material in assembly with said module.

6. A process as recited in claim 1 wherein said adhesive is grout applied in a substantially viscous liquid form and is applied by
providing a contained quantity of grout;
securing said substrate to a movable fixture prior to assembly of said module; and
lowering said substrate by movement of said fixture sufficiently into said contained quantity of grout to coat one of the side surfaces and substantially all of said edge surfaces of said substrate with grout.

7. A process as recited in claim 6, wherein assembly of said substrate and said pad is accomplished after coating of said substrate with grout by:
bringing said grout coated side surface of said substrate into assembly with one of the side surfaces of said pad; and
applying mechanical pressure during at least part of the curing period of the grout.

8. A process as recited in claim 7, including:
providing a plurality of edge battens of fibrous insulation material having side surfaces of a width substantially equaling the combined thickness of said fibrous pad and said substrate;
bringing said edge battens of fibrous insulation material into engagement with said grout coated edges of said substrate; and
applying mechanical force to said edge battens of fibrous insulation material and to said substrate during at least a portion of the curing period of the grout.

9. A process as recited in claim 8, including:
at least partially enclosing said module in a protective wrapper, said protective wrapping maintaining said module under mechanical compression during complete curing of the grout.

10. A process as recited in claim 8, including:
at least partially enclosing said module in a protective wrapper, said protective wrapper maintaining said module under mechanical compression during complete curing of the grout.

11. A process for the manufacture of insulated furnace liner modules, said process comprising:
arranging a plurality of layers of fibrous insulating material into a multi-layer stack;
imparting incremental linear movement to said stock;
severing a portion of said stack at each increment of movement of said stack, thereby defining a generally rectangular pad composed of a plurality of battens of fibrous insulating material, said pad having side surfaces defined by exposed edge surfaces of said battens;
providing a generally rigid block of insulating material, said block having side surfaces corresponding to the configuration and dimension of said pad and having a plurality of edge surfaces;
providing a quantity of uncured adhesive material having a curing period;
bringing one of said side surfaces of fibrous insulation material having side surfaces of a width and said block into engagement with said adhesive material therebetween, defining a pad/block assembly having side surfaces and edge surfaces;
providing a plurality of edge battens of a width substantially equaling the combined thickness of said assembled pad and block;
securing said edge battens of fibrous insulation material to each of the edge surfaces of said pad block assembly by bringing the side surfaces of each of said edge battens into assembly with respective ones of the edge surfaces of said pad block assembly in the presence of a quantity of said adhesive and defining an assembled insulating module; and
applying mechanical force to said assembled module during at least a portion of the curing period of said adhesive material.

12. A process as recited in claim 11, including:
at least partially enclosing said module in a protective wrapping in such manner as to maintain said module under mechanical compression during at least a part of the curing period of said adhesive material.

13. A process as recited in claim 12, wherein wrapping said module comprises:
locating protective wrapping material relative to a module assembly station prior to assembly of said pad and said block;
placing said pad at said mocule assembly station on top of at least a portion of said wrapping material;
bringing said block into assembly with said pad thus forming said module;
folding portions of said wrapping material about said module; and
securing said folded portions of said wrapping material about said module.

14. A process as recited in claim 13, wherein:
said securing of said folded portions of said material is accomplished by stapling said wrapping material to said block.

15. A process as recited in claim 11, wherein said adhesive material is grout, applied in substantially viscous liquid uncured form and is applied by:
providing a contained quantity of grout;
placing said block into a movable fixture prior to formation of said pad block assembly;
lowering said block by movement of said fixture sufficiently into said contained quantity of grout to coat one of the side surfaces and substantially all of the edge surfaces of said block with grout.

16. A process as recited in claim 15, wherein assembly of said block and pad is accomplished after coating of said block with grout by:
bringing said grout coated side surface of said block into assembly with one of the side surfaces of said pad; and
applying mechanical pressure to said block and pad during at least part of the curing of grout.

17. A process as recited in claim 16, including:
providing a plurality of edge battens of fibrous insulation material having side surfaces of a width substantially equaling the combined thickness of said fibrous pad and said block of insulation material;
bringing said edge battens of fibrous insulation material into engagement with said grout coated edges of said block; and
applying mechanical force to said edge battens of fibrous material and to said block during at least a portion of the curing time of grout.

18. A process as recited in claim 11, including:
severing said stacked layers of fibrous insulation material longitudinally prior to incremental severing of said stack and defining at least two elongated stacks of fibrous insulation material; and
said incremental severing defining a plurality of said generally rectangular pads of insulation material at each incremental severing operation, each of said pads being separately handled in assembly of separate modules.

19. A process as recited in claim 11, wherein said arranging of said plurality of layers of fibrous material into a stack comprises:
arranging the trailing extremity of each of said layers in such manner that each of the layers is staggered the width of one of said battens, whereby a similar succeeding stack of such layers may be formed to enable the fibrous material to be fed continuously without encountering a vertical joint extending through all of the layers.

20. A machine for the manufacture of insulated modules for lining enclosures such as furnaces and the like, said machine comprising:
means for retaining a supply of elongated sheets of fibrous insulation material;
means for severing from said supply of elongated sheets a pad of insulating material comprised of a plurality of battens of said insulation material arranged in side to side relation;
means for locating said insulating pad of insulation material with the edge surfaces of the battens exposed and cooperating to define side surfaces of said insulating pad;
means defining a module assembly station;
means for retaining said pad of insulating material at said module assembly station;
means for coating a mineral block of insulating material with an adhesive material;
means for transporting said coated mineral blocks to said module assembly station and bringing said coated mineral blocks into assembly with said pad of insulating material, thereby defining an insulation module assembly; and
means for placing said insulation module assembly under mechanical compression during at least a part of the curing period of said adhesive material.

21. A machine as recited in claim 20, including:
means for at least partially enclosing said insulation module assembly in a protective wrapping, said wrapping maintaining said module under a degree of compression during full curing of said adhesive material.

22. A machine as recited in claim 20, including:
a supply of edge battens of fibrous material;
a plurality of said edge battens of fibrous material being placed about the exposed edges of said pad of insulation material and the coated mineral block by manual operation, said edge battens of fibrous material cooperating with said pad and said block to define said insulation module; and
means for at least partially enclosing said insulation module assembly in a protective wrapping and maintaining said module under a degree of compression during curing of said adhesive material.

23. A machine as recited in claim 20, wherein said means for retaining a supply of elongated sheets of fibrous insulation material comprises:
elongated conveyor means defining a stack support, said fibrous material being positioned in layers on said conveyor means and defining a multi-layer stack, said stack being moved incrementally by said conveyor means by an increment distance equaling the thickness of said pad of insulation material.

24. A machine as recited in claim 23, wherein said means for severing battens of said insulation material from said supply comprises:
a cross cut saw mechanism being disposed in movable relation to said conveyor means; and
means for causing transverse movement of said cross cut saw mechanism and causing a cut across the leading extremity of said multi-layer stack of insulating material following each increment of movement of said stack by said conveyor means, said battens and said pad of battens of insulating material resulting from said transverse movement of said crosscut saw mechanism.

25. A machine as recited in claim 24, wherein said means for arranging said battens of insulation material in side-by-side relationship comprises:
means for applying said plurality of sheets of insulation material in said multi-layer stack on said conveyor means, together with said means for severing battens of insulation material from said multi-layer stack.

26. A machine as recited in claim 20, wherein said means for positioning said pad of insulating material at a module assembly station comprises:
fixture means for engaging the leading extremity of the multi-layer stack of insulating material prior to severing battens of insulation material from said stack, said engaging means being capable of retaining each of the various layers of said stack of insulating material in substantially immovable relation with the other layers, said fixture means being manually movable from the leading extremity of said stack to said module assembly station, transporting said pad therewith; and
insulating pad ejector means being provided on said fixture means and being operative to eject said pad of insulating material from said fixture after said pad has been properly positioned at said assembly station of said machine.

27. A machine as recited in claim 26, wherein said fixture means includes:

impaling means being disposed for receiving and retaining relationship within the various layers of fibrous insulating material of said stack, said impaling means retaining said battens of said pad of insulating material in substantially immovable relation one with the other during movement of said pad to said module assembly station.

28. A machine as recited in claim 27, wherein said fixture includes:
locking means for retaining said fixture mechanism in a static position during transporting and positioning of said pad at said module assembly station; and
said insulating pad ejector means being operative upon release of said locking means for ejecting said pad of insulating material from said impaling means.

29. A machine as recited in claim 28, wherein said pad ejector means comprises:
an ejector plate disposed in movable relation to said fixture and having a plurality of apertures formed therein, said impaling means extending through said apertures;
an ejector and locking shaft being movably carried by said fixture, said shaft being connected to said ejector plate; and
means for imparting movement to said ejector plate and causing said impaling means to be separated from said pad of insulation material.

30. A machine as recited in claim 29, wherein said means for imparting movement to said ejector plate comprises a compression spring carried by said fixture and imparting a force to said shaft for movement of said shaft in one direction thereof.

31. A machine as recited in claim 20, wherein said means defining said assembly station comprises:
pad locating means; and
means for maintaining said module under mechanical compression during at least a portion of the curing time of said adhesive material.

32. A machine as recited in claim 31, wherein said pad locating means comprises:
a module support plate; and
a plurality of pad locating fingers projecting upwardly from said module support plate.

33. A machine as recited in claim 32, wherein said pad locating means also comprises:
sheet locator means that extend through apertures formed in a sheet of protective wrapping material; and
said module assembly station includes means for at least partially enclosing said module in said sheet of protective wrapping material during assembly of said module.

34. A machine as recited in claim 20, wherein said module assembly station of said machine comprises:
receptacle means;
a module support plate being disposed in receiving alignment with said receptacle means and being adapted for lowering into said receptacle means; and
a linear fluid motor being disposed at the lower portion of said receptacle means and being operatively connected to said module support plate, said linear fluid motor yielding responsive to application of sufficient force to said module to achieve predetermined compression of said module and allowing said module to be forced into said receptacle along with said module support plate.

35. A machine as recited in claim 34, wherein said module assembly station includes:
wrapper folding means disposed in movable assembly with said receptacle and being operative responsive to predetermined movement of said module support plate and said module into said receptacle to cause folding of a protective wrapper about at least a portion of said module.

36. A machine as recited in claim 20, wherein said means for coating a mineral block of insulating material with an adhesive material comprises:
means for providing a quantity of uncured adhesive material;
means for retaining a mineral block of insulating material to be coated;
means for lowering said mineral block into said adhesive material sufficiently to coat one of the side surfaces and substantially all of the edge surfaces of the block with a coating of said adhesive material and for raising said coated mineral block from said adhesive material following coating thereof; and
means for transporting said coated mineral block to said module assembly station and for placing said mineral block in assembly with said pad of insulating material.

37. A machine as recited in claim 36, wherein said means providing a quantity of uncured adhesive material comprise:
a bin having an outlet opening defined at the lowermost portion thereof, said ben containing a quantity of adhesive material;
adhesive containing means being disposed adjacent said bin;
means for continuously transporting adhesive material from said bin to said adhesive containing means, said adhesive containing means receiving said mineral blocks for coating the same with said adhesive.

38. A machine as recited in claim 37, wherein said means for continuously transporting adhesive material comprises:
pump means having the suction side thereof in communication with said outlet opening of said bin and having the discharge side thereof disposed in communication with said adhesive containing means; and
said adhesive containing means discharging overflow of adhesive material therefrom into said bin.

39. A machine as recited in claim 36, wherein said means for retaining a mineral block of insulating material comprises:
block support plate means;
a plurality of spike means adapted for retaining engagement into a mineral block to be supported thereby; and
means for ejecting said mineral block from said spike means of said mineral block support plate means.

40. A machine as recited in claim 39, wherein said ejecting means comprises:
ejector housing means being connected to said block support plate means, said connector housing being received by said block transporting means;
hydraulic block ejection cylinder means being disposed within said ejector housing means and having an operating stem disposed for ejecting engagement with said mineral block and ejecting said mineral block from said spike means upon actuation of said hydraulic block ejection cylinder.

41. A machine as recited in claim 36, wherein said means for transporting and placing said mineral block comprises:

hydraulic cylinder means being said means for lowering and raising said mineral block; and means pivotally mounting said hydraulic cylinder means for movement through an arc comprising the arcuate distance between said means for coating said mineral block and said module assembly station.

42. A machine as recited in claim 20, wherein said means for severing battens of insulation material comprises:

means for causing incremental linear movement of said supply of elongated sheets of fiberous insulation material;

a transverse saw mechanism;

means for raising and lowering said saw mechanism relative to said supply of elongated sheets of fiberous insulation material, said saw mechanism being lowered following each increment of linear movement of said supply of elongated sheets.

43. A machine as recited in claim 42, wherein said means for severing battens of insulation material includes:

a dividing saw mechansim being disposed in alignment with the linear axis of said supply of said sheets of insulation material, said dividing saw mechanism dividing said sheets into linear strips upon linear movement of said supply of elongated sheets of insulation material.

44. A machine as recited in claim 43, wherein said supply of elongated sheets of insulation material comprises:

a multi-layer stack of elongated sheets of said insulation material; and conveyor means supporting said stack and being operative to cause incremental movement of said stack toward said transverse and dividing saw mechanisms, said dividing saw mechanism severing said stack into a plurality of elongated stacks and said transverse saw mechanism causing a transverse cut through said stack simultaneously severing a plurality of battens defining a pad of insulation material from each of said plurality of elongated stacks.

* * * * *

UNITED STATES PATENT AND TRADEMARK OFFICE
CERTIFICATE OF CORRECTION

PATENT NO. : 3,928,097
DATED : December 23, 1975
INVENTOR(S) : Robert A. Sauder, Gary R. Kendrick It is certified that error appears in the above-identified patent and that said Letters Patent are hereby corrected as shown below:

--11. A process for the manufacture of insulated furnace liner modules, said process comprising:

arranging a plurality of layers of fibrous insu-
        lating material into a multi-layer stack;

imparting incremental linear movement to said stock;

severing a portion of said stack at each increment
        of movement of said stack, thereby defining a
        generally rectangular pad composed of a plurality
        of battens of fibrous insulating material, said
        pad having side surfaces defined by exposed edge
        surfaces of said battens;

providing a generally rigid block of insulating material,
        said block having side surfaces corresponding to

UNITED STATES PATENT AND TRADEMARK OFFICE
CERTIFICATE OF CORRECTION

PATENT NO. : 3,928,097
DATED : December 23, 1975
INVENTOR(S) : Robert A. Sauder, Gary R. Kendrick It is certified that error appears in the above-identified patent and that said Letters Patent are hereby corrected as shown below:

the configuration and dimension of said pad and having a plurality of edge surfaces;

providing a quantity of uncured adhesive material having a curing period;

bringing one of said side surfaces of said pad and said block into engagement with said adhesive material therebetween, defining a pad/block assembly having side surfaces and edge surfaces;

providing a plurality of edge battens of fibrous insulation material having side surfaces of a width substantially equaling the combined thickness of said assembled pad and block;

securing said edge battens of fibrous insulation

UNITED STATES PATENT AND TRADEMARK OFFICE
CERTIFICATE OF CORRECTION

PATENT NO. : 3,928,097  Page 3 of 3

DATED : December 23, 1975

INVENTOR(S) : Robert A. Sauder, Gary R. Kendrick

It is certified that error appears in the above-identified patent and that said Letters Patent are hereby corrected as shown below:

material to each of the edge surfaces of said pad block assembly by bringing the side surfaces of each of said edge battens into assembly with respective ones of the edge surfaces of said pad block assembly in the presence of a quantity of said adhesive and defining an assembled insulating module; and applying mechanical force to said assembled module during at least a portion of the curing period of said adhesive material.--

Signed and Sealed this

Twenty-second Day of February 1977

[SEAL]

Attest:

RUTH C. MASON  
*Attesting Officer*

C. MARSHALL DANN  
*Commissioner of Patents and Trademarks*